(12) United States Patent
Kim et al.

(10) Patent No.: US 12,550,064 B2
(45) Date of Patent: Feb. 10, 2026

(54) METHOD AND APPARATUS FOR SAVING POWER OF USER EQUIPMENT IN WIRELESS COMMUNICATION SYSTEM

(71) Applicant: SAMSUNG ELECTRONICS CO., LTD., Suwon-si (KR)

(72) Inventors: Taehyoung Kim, Suwon-si (KR); Jinkyu Kang, Suwon-si (KR); Youngbum Kim, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/349,540

(22) Filed: Jul. 10, 2023

(65) Prior Publication Data

US 2023/0354199 A1   Nov. 2, 2023

Related U.S. Application Data

(63) Continuation of application No. 17/086,291, filed on Oct. 30, 2020, now Pat. No. 11,716,688.

(30) Foreign Application Priority Data

Oct. 31, 2019   (KR) .................. 10-2019-0137114

(51) Int. Cl.
    *H04W 52/02*   (2009.01)
    *H04L 5/00*   (2006.01)
    (Continued)

(52) U.S. Cl.
    CPC ....... *H04W 52/0235* (2013.01); *H04L 5/0053* (2013.01); *H04W 24/08* (2013.01);
    (Continued)

(58) Field of Classification Search
    CPC . H04W 52/0235; H04W 24/08; H04W 72/23; H04W 76/28; H04W 72/0446;
    (Continued)

(56) References Cited

U.S. PATENT DOCUMENTS 10,123,319 B2   11/2018   Papasakellariou et al.
11,665,642 B2   5/2023   Shen et al.
(Continued)

FOREIGN PATENT DOCUMENTS

CN   103609084 A   2/2014
KR   10-2020-0031446 A   3/2020
(Continued)

OTHER PUBLICATIONS

The First Office Action dated Jan. 24, 2024, in connection with Chinese Patent Application No. 202080076432.4, 14 pages.
(Continued)

*Primary Examiner* — Charles C Jiang

(57) ABSTRACT

A method performed by a user equipment (UE) in a wireless communication system is provided. The method comprises: receiving, from a base station, higher layer signaling comprising a power saving offset (PS-offset) indicating a first start time when the UE starts, prior to a second start time of a drx-onDuration timer, monitoring physical downlink channel (PDCCH) for downlink control information (DCI) notifying power saving information outside a discontinuous reception (DRX) active time and parameters indicating a search space; identifying at least one PDCCH monitoring occasion for the DCI based on the PS-offset and the parameters indicating the search space; and monitoring the DCI on the at least one PDCCH monitoring occasion.

13 Claims, 12 Drawing Sheets

(51) Int. Cl.
  *H04W 24/08*      (2009.01)
  *H04W 72/23*      (2023.01)
  *H04W 76/28*      (2018.01)
  *H04W 72/0446*    (2023.01)

(52) U.S. Cl.
  CPC ........... *H04W 72/23* (2023.01); *H04W 76/28* (2018.02); *H04W 72/0446* (2013.01)

(58) Field of Classification Search
  CPC ......... H04W 52/0212; H04W 52/0248; H04L 5/0053; H04L 5/0007; Y02D 30/70
  See application file for complete search history.

(56) References Cited

U.S. PATENT DOCUMENTS

| | | | |
|---|---|---|---|
| 2019/0021052 A1* | 1/2019 | Kadiri | H04L 5/0098 |
| 2020/0092813 A1 | 3/2020 | Kim et al. | |
| 2020/0351780 A1* | 11/2020 | Liao | H04W 76/28 |
| 2020/0351786 A1* | 11/2020 | Koskela | H04W 52/0216 |
| 2021/0051698 A1* | 2/2021 | Tsai | H04W 72/23 |
| 2021/0259044 A1 | 8/2021 | Islam et al. | |
| 2021/0360610 A1 | 11/2021 | Kim et al. | |

FOREIGN PATENT DOCUMENTS

| | | |
|---|---|---|
| WO | 2019/008491 A1 | 1/2019 |
| WO | 2019183848 A1 | 10/2019 |
| WO | 2020060890 A1 | 3/2020 |

OTHER PUBLICATIONS

Examination report dated Dec. 2, 2023, in connection with Indian Patent Application No. 202237016199, 8 pages.
Communication under Rule 71(3) EPC dated May 7, 2025, in connection with European Application No. 20882086.0, 76 pages.
Office Action dated Sep. 18, 2025, in connection with Korean Application No. 10-2019-0137114, 8 pages.
Communication under Rule 71(3) EPC dated Oct. 10, 2025, in connection with European Application No. 20882086.0, 76 pages.

* cited by examiner

METHOD AND APPARATUS FOR SAVING POWER OF USER EQUIPMENT IN WIRELESS COMMUNICATION SYSTEM

CROSS-REFERENCE TO RELATED APPLICATION

This application is a continuation of application Ser. No. 17/086,291 filed Oct. 30, 2020, which is based on and claims priority under 35 U.S.C. § 119 to Korean Patent Application No. 10-2019-0137114 filed on Oct. 31, 2019, in the Korean Intellectual Property Office, the disclosure of which are incorporated by reference herein in their entirety.

BACKGROUND

1. Field

The disclosure relates to a method and apparatus for saving power of a user equipment (UE) in a wireless communication system.

2. Description of Related Art

To meet the increase in demand with respect to wireless data traffic after the commercialization of $4^{th}$ Generation (4G) communication systems, considerable efforts have been made to develop improved $5^{th}$ Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in a millimeter wave (mmWave) band (e.g., a 60 gigaHertz (GHz) band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, the development of techniques, such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, has been conducted. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes, and Filter Bank Multi-Carrier (FBMC), Non-Orthogonal Multiple Access (NOMA), and Sparse Code Multiple Access (SCMA), which are advanced access techniques, have been developed.

The Internet has evolved from a human-centered connection network, through which humans generate and consume information, to an Internet of Things (IoT) network that exchanges and processes information between distributed elements such as objects. An Internet of Everything (IoE) technology is emerging, in which a technology related to the IoT is combined with, for example, a technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as a big data processing technique described above may be an example of convergence of 5G communication technology and IoT technology.

As it is possible to provide various services according to the development of wireless communication systems, there is a need for a method of efficiently providing these services. In particular, there is a need for a communication method of saving power of a user equipment so that services may be provided to a user for a longer time.

SUMMARY

Provided are a communication method and apparatus for saving power of a user equipment (UE) in a wireless communication system.

In accordance with one aspect of the disclosure, a method performed by a user equipment (UE) in a wireless communication system is provided. The method comprises: receiving, from a base station, higher layer signaling comprising a power saving offset (PS-offset) indicating a first start time when the UE starts, prior to a second start time of a drx-onDuration timer, monitoring physical downlink channel (PDCCH) for downlink control information (DCI) notifying power saving information outside a discontinuous reception (DRX) active time and parameters indicating a search space; identifying at least one PDCCH monitoring occasion for the DCI based on the PS-offset and the parameters indicating the search space; and monitoring the DCI on the at least one PDCCH monitoring occasion.

In an embodiment, the parameters indicating the search space comprise a monitoring period and a monitoring offset in slot unit, a monitoring duration in slot unit, and at least one symbol in a slot configured for PDCCH monitoring.

In an embodiment, the identifying the at least one PDCCH monitoring occasion for the DCI comprises identifying the at least one monitoring occasion which is located before the second start time and located in a monitoring time interval after the first start time among at least one monitoring time interval indicated by the parameters indicating the search space.

In an embodiment, the at least one monitoring time interval indicated by the parameters indicating the search space comprises each time interval during the monitoring duration from each slot determined by the monitoring offset from each first slot of each time period that exists for periodicity of the monitoring period.

In an embodiment, the identifying the at least one PDCCH monitoring occasion for the DCI further comprises identifying the at least one monitoring occasion which is located before a predetermined time gap from the second start time.

In accordance with another aspect of the disclosure, a user equipment (UE) in a wireless communication system is provided. The UE comprises: a transceiver; and at least one processor operably coupled with the transceiver and configured to: control the transceiver to receive, from a base station, higher layer signaling comprising a power saving offset (PS-offset) indicating a first start time when the UE starts, prior to a second start time of a drx-onDuration timer, monitoring physical downlink channel (PDCCH) for downlink control information (DCI) notifying power saving information outside a discontinuous reception (DRX) active time and parameters indicating a search space, identify at least one PDCCH monitoring occasion for the DCI based on the PS-offset and the parameters indicating the search space, and monitor the DCI on the at least one PDCCH monitoring occasion.

In an embodiment, the parameters indicating the search space comprise a monitoring period and a monitoring offset in slot unit, a monitoring duration in slot unit, and at least one symbol in a slot configured for PDCCH monitoring.

In an embodiment, the at least one processor is further configured to identify the at least one monitoring occasion which is located before the second start time and located in a monitoring time interval after the first start time among at least one monitoring time interval indicated by the parameters indicating the search space.

In an embodiment, the at least one monitoring time interval indicated by the parameters indicating the search space comprises each time interval during the monitoring duration from each slot determined by the monitoring offset from each first slot of each time period that exists for periodicity of the monitoring period.

In an embodiment, the at least one processor is further configured to identify the at least one monitoring occasion which is located before a predetermined time gap from the second start time.

Additional aspects will be set forth in part in the description which follows and, in part, will be apparent from the description, or may be learned by practice of the presented embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
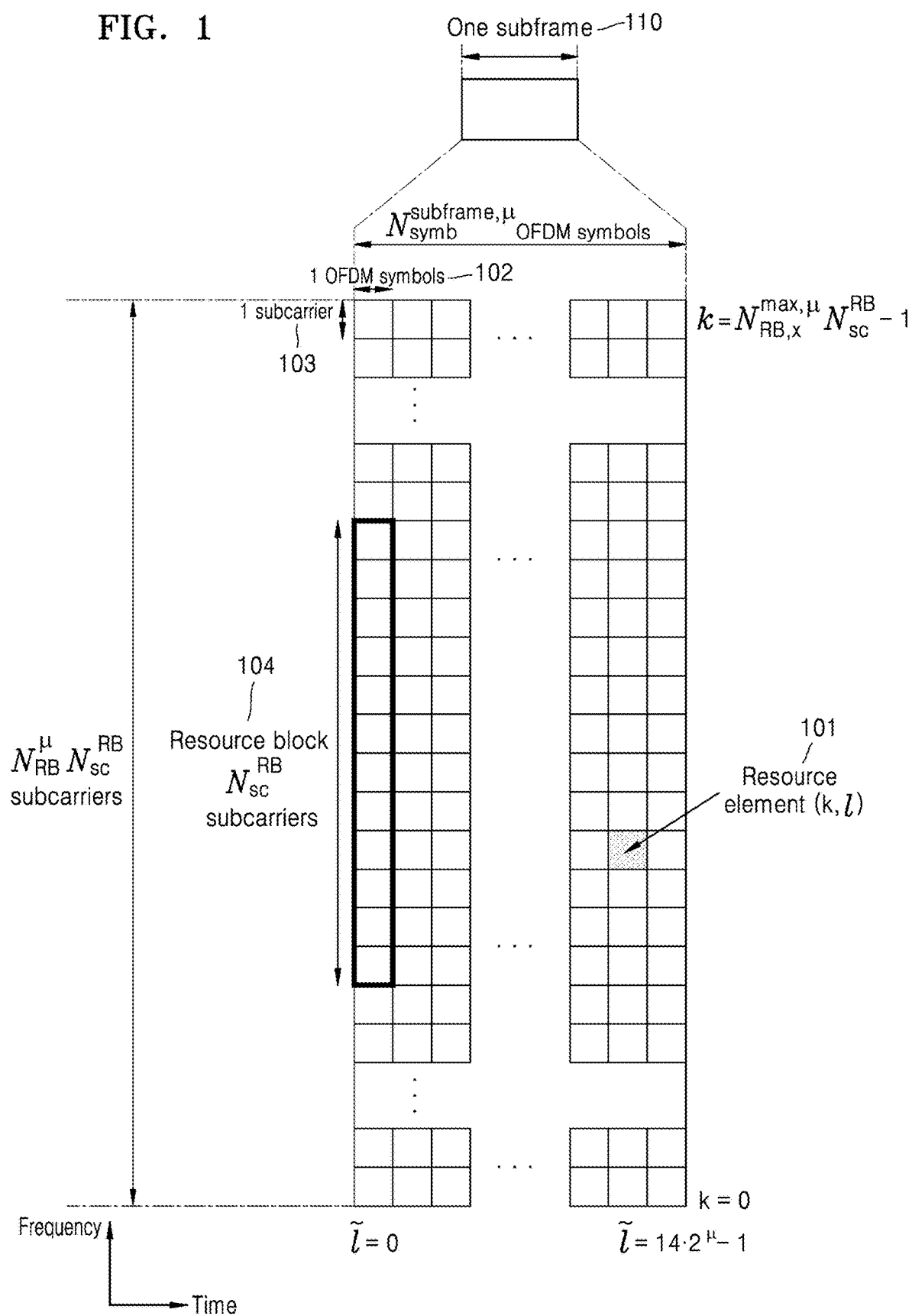
FIG. 1 illustrates a diagram illustrating a basic structure of a time-frequency domain in a $5^{th}$ Generation (5G) system.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments of the disclosure, technical contents that are well known in the art to which the disclosure belongs and are not directly associated with the disclosure will not be described. By omitting the unnecessary description, the disclosure is conveyed more clearly without obscuring the subject matter of the disclosure.

For the same reason, some elements in the accompanying drawings are exaggerated, omitted, or schematically illustrated. Also, the size of each element does not reflect the actual size. In each drawing, the same reference numerals are assigned to the same or corresponding elements.

The advantages and features of the disclosure and methods of achieving them will become more apparent from the following embodiments of the disclosure, which are described in detail in conjunction with the accompanying drawings. However, it will be understood that the disclosure is not limited to the following embodiments of the disclosure, and various modifications may be made without departing from the scope of the disclosure. The embodiments of the disclosure set forth herein are provided so that the disclosure will be thorough and complete, and will fully convey the concept of the disclosure to those of ordinary skill in the art. The disclosure should be defined by the appended claims. Like reference numerals denote like elements throughout the specification. Also, in describing the disclosure, when the detailed description of the relevant functions or configurations is determined to unnecessarily obscure the gist of the disclosure, a detailed description thereof may be omitted. The terms as used herein are those defined by taking into account functions in the disclosure, but the terms may vary according to the intention of users or those of ordinary skill in the art, precedents, or the like. Therefore, the definitions should be made based on the contents throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station is a subject that performs resource allocation of a terminal and may be at least one of gNode B, eNode B, Node B, base station (BS), radio access unit, base station controller, or a node on a network. In the disclosure, a downlink (DL) is a radio transmission path of a signal transmitted from a base station to a terminal, and an uplink (UL) is a radio transmission path of a signal transmitted from a terminal to a base station. Also, although a Long-Term Evolution (LTE), LTE-Advanced (LTE-A), or $5^{th}$ Generation (5G) system may be described below as an example, embodiments of the disclosure may be applicable to other communication systems having a similar technical background or channel form. For example, this may include a 5G mobile communication technology (5G, New Radio, NR) developed after LTE-A. 5G may be a concept including existing LTE, LTE-A, and similar other services. Also, the disclosure may be applicable to other communication systems through some modifications without departing from the scope of the disclosure.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be mounted on the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

A radio communication system has evolved from a system providing voice-oriented services to a broadband wireless communication system providing high-speed high quality packet data services of communication standards such as High Speed Packet Access (HSPA) of 3GPP, LTE or Evolved Universal Terrestrial Radio Access (E-UTRA), LTE-A, LTE-Pro, High Rate Packet Data (HRPD) of 3GPP2, Ultra Mobile Broadband (UMB), and IEEE 802.16e.

As a representative example of the broadband wireless communication system, the LTE system employs an Orthogonal Frequency Division Multiplexing (OFDM) scheme in a DL and employs a Single Carrier Frequency Division Multiple Access (SC-FDMA) scheme in an UL. The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be distinguished by performing assignment and operation so that time-frequency resources for carrying data or control information for each user do not overlap each other, that is, orthogonality is established.

Future communication systems after LTE, that is, 5G communication systems have to be able to freely reflect various requirements of users and service providers. Therefore, services that satisfy various requirements at the same time have to be supported. Services considered for 5G communication systems include Enhanced Mobile Broadband (eMBB), Massive Machine Type Communication (MMTC), and Ultra Reliability Low Latency Communication (URLLC).

eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. Also, the 5G communication systems have to provide a peak data rate and simultaneously provide an increased user perceived data rate of the terminal. In order to satisfy such requirements, there is a need to improve various transmission and reception technologies including an improved multi-input multi-output (MIMO) transmission technology. Also, in a 2 GHz band used by LTE, signals are transmitted using up to 20 MHz transmission bandwidth. However, 5G communication systems use a frequency bandwidth wider than 20 MHz in 3-6 GHz frequency bands or 6 GHz or higher frequency bands. Therefore, the data rate required by 5G communication systems may be satisfied.

At the same time, mMTC is under consideration so as to support application services such as Internet of Thing (IoT) in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time such as 10 to 15 years may be required.

Finally, URLLC is a cellular-based wireless communication service used for a specific purpose (mission-critical). For example, services used in remote control for robots or machinery, industrial automation, unmanned aerial vehicles, remote health care, emergency alerts, or the like may be considered. Therefore, communication provided by URLLC has to provide very low latency and very high reliability. For example, a service supporting URLLC has to satisfy air interface latency of less than 0.5 milliseconds and simultaneously has a packet error rate of 10$^{-5}$ or less. Therefore, for services supporting URLLC, the 5G systems have to provide a smaller transmit time interval (TTI) than other services and simultaneously require a design matter that has to allocate a wide resource in a frequency band so as to ensure reliability of a communication link.

The three services of 5G, that is, eMBB, URLLC, and mMTC, may be multiplexed and transmitted in a single system. In this case, different transmission and reception technologies and transmission and reception parameters may be used between services so as to satisfy different requirements of the respective services. 5G is not limited to the three services described above.

Hereinafter, a frame structure of a 5G system will be described in more detail with reference to the accompanying drawings.

FIG. 1 illustrates a diagram illustrating a basic structure of a time-frequency domain, which is a radio resource domain in which data or a control channel is transmitted, in a 5G system.

In FIG. 1, a horizontal axis represents a time domain and a vertical axis represents a frequency domain. A basic unit of resources in the time and frequency domains is a resource element (RE) 101, which may be defined as one OFDM symbol 102 on the time axis and one subcarrier 103 on the frequency axis. $N_{SC}^{RB}$ (e.g., 12) consecutive REs in the frequency domain may constitute one resource block (RB) 104.

Figure 2:
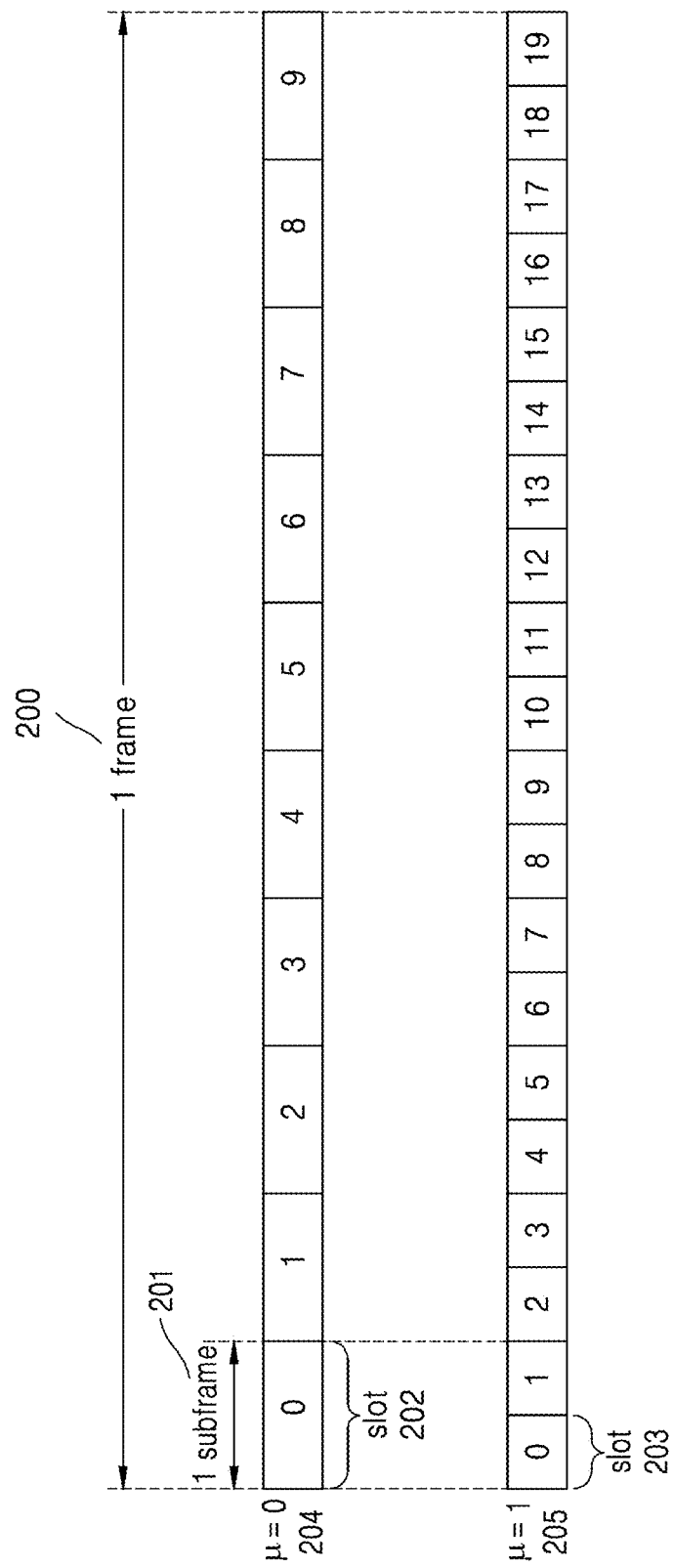
FIG. 2 illustrates a diagram illustrating frame, subframe, and slot structures of the 5G system.

FIG. 2 illustrates a diagram illustrating a slot structure considered in the 5G system.

An example of a structure of a frame 200, a subframe 201, and a slot 202 is illustrated in FIG. 2. One frame 200 may be defined as 10 milliseconds (ms). One subframe 201 may be defined as 1 ms. Therefore, one frame 200 may include a total of 10 subframes 201. One slot 202 or 203 may be defined as 14 OFDM symbols (i.e. number ($N_{symb}^{slot}$) of symbols per slot=14). One subframe 201 may include one or more slots 202 and 203. The number of slots 202 and 203 per one subframe 201 may be changed according to setting values (μ) 204 and 205 for a subcarrier spacing. In the example of FIG. 2, a case in which the setting value for the subcarrier spacing is μ=0 (204) and μ=1 (205) is illustrated. In the case of μ=0 (204), one subframe 201 may include one slot 202, and in the case of μ=1 (205), one subframe 201 may include two slots 203. That is, the number $N_{slot}^{subframe,\mu}$ of slots per one subframe may be changed according to the setting value p for the subcarrier spacing. Therefore, the number ($N_{slot}^{subframe,\mu}$) of slots per one frame may be changed. $N_{slot}^{subframe,\mu}$ and $N_{slot}^{subframe,\mu}$ according to each setting value p for the subcarrier spacing may be defined as Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in a 5G communication system will be described in detail with reference to the accompanying drawings.

Figure 3:
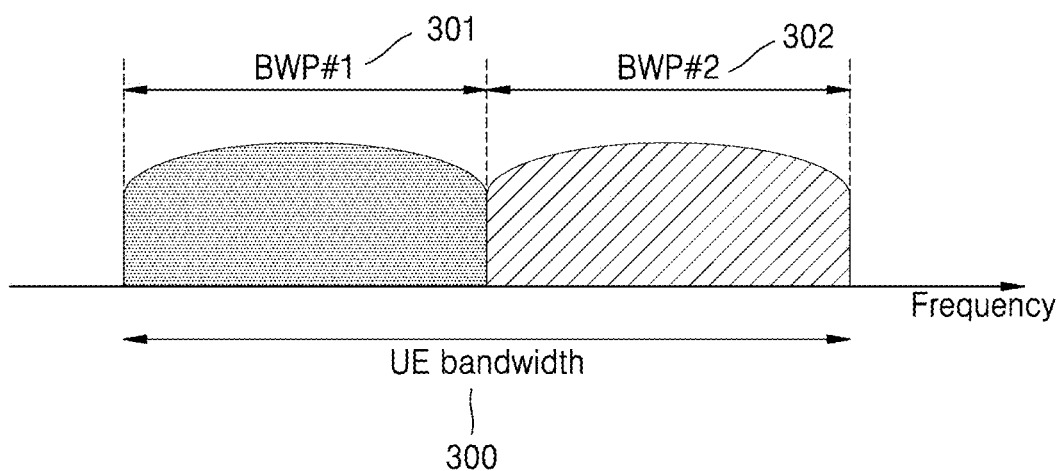
FIG. 3 illustrates a diagram illustrating an example of configuring a bandwidth part in the 5G system.

FIG. 3 illustrates a diagram illustrating an example of configuring a BWP in the 5G system.

FIG. 3 illustrates an example in which a UE bandwidth 300 is configured as two BWPs, that is, BWP #1 301 and BWP #2 302. A base station may configure one or more BWPs to the UE and may configure the following information with respect to each BWP.

TABLE 2

| BWP ::= | SEQUENCE { |
|---|---|
| bwp-Id | BWP-Id, |
| (BWP ID) | |
| locationAndBandwidth | INTEGER (1..65536), |
| (BWP location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

The disclosure is not limited to the above example. In addition to the configuration information, various parameters related to the BWP may be configured to the UE. The base station may transmit the information to the UE through higher layer signaling, for example, radio resource control (RRC) signaling. At least one of the configured one or more BWPs may be activated. Whether to activate the configured BWP may be transmitted from the base station to the UE semi-statically through the RRC signaling or dynamically through downlink control information (DCI).

According to some embodiments of the disclosure, the UE before RRC connection may be configured with an initial BWP for initial access from the base station through a master information block (MIB). More specifically, the UE may receive configuration information about a search space and a control resource set (CORESET) through which a physical downlink control channel (PDCCH) for receiving system information necessary for initial access (remaining system information (RMSI) or system information block 1 (SIB1)) may be transmitted through the MIB in an initial access operation. The control resource set and the search space, which are configured as MIBs, may be regarded as identity (ID) 0, respectively. The base station may notify the UE of configuration information, such as frequency assignment information, time assignment information, and numerology for the control resource set #0 through the MIB. Also, the base station may notify the UE of configuration information for monitoring periodicity and occasion for the control resource set #0, that is, configuration information for the search space #0, through the MIB. The UE may determine or regard the frequency domain configured as the control resource set #0 obtained from the MIB as the initial BWP for initial access. In this case, the ID of the initial BWP may be determined (or regarded) as zero.

The configuration of the BWP supported by 5G may be used for various purposes.

According to some embodiments of the disclosure, when a bandwidth supported by the UE is less than a system bandwidth, this may be supported through the BWP configuration. For example, the base station may configure a frequency location (configuration information 2) of the BWP to the UE so that the UE may transmit and receive data at a specific frequency location within the system bandwidth.

Also, according to some embodiments of the disclosure, the base station may configure a plurality of BWPs to the UE for the purpose of supporting different numerologies. For example, two BWPs may be configured to use a subcarrier spacing of 15 kHz and a subcarrier spacing of 30 kHz, respectively, so as to support a random UE for data transmission and reception using a subcarrier spacing of 15 kHz and a subcarrier spacing of 30 kHz. Different BWPs may be frequency division multiplexed. When attempting to transmit and receive data at a particular subcarrier spacing, the BWP configured with the corresponding subcarrier spacing may be activated.

Also, according to some embodiments of the disclosure, the base station may configure the BWPs with bandwidths of different sizes to the UE for the purpose of reducing power consumption of the UE. For example, when the UE supports a very large bandwidth, for example, a bandwidth of 100 MHz, and always transmits and receives data at the corresponding bandwidth, the transmission or reception may cause very high power consumption in the UE. In particular, when the UE performs monitoring on an unnecessary DL control channels of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 megaHertz (MHz). In a situation without traffic, the UE may perform a monitoring operation on a BWP of 20 MHz. When data to be transmitted or received has occurred, the UE may transmit and receive data in a BWP of 100 MHz, according to an indication of the base station.

In the method of configuring the BWP, the UEs before the RRC connection may receive configuration information about the initial BWP through the MIB in the initial connection operation. More specifically, the UE may be configured with a control resource set (CORESET) for a DL control channel through which DCI for scheduling a system information block (SIB) may be transmitted from a MIB of a physical broadcast channel (PBCH). The bandwidth of the control resource set configured to the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

When one or more BWPs have been configured to the UE, the base station may indicate the UE to switch the BWP by using a BWP indicator field in DCI. For example, in FIG. 3, when the currently active BWP of the UE is BWP #1 301, the base station may indicate BWP #2 302 to the UE by using the BWP indicator in DCI, and the UE may perform a BWP switch to the BWP #2 302 indicated by the BWP indicator in the received DCI.

As described above, the DCI-based BWP switch may be indicated by the DCI scheduling the PDSCH or physical uplink shared channel (PUSCH). Thus, when the UE receives a request to switch the BWP, it should be possible to receive or transmit the PDSCH or the PUSCH scheduled by the DCI without difficulty in the switched BWP. To this end, the standard stipulates requirements for a delay time ($T_{BWP}$) required when switching the BWP and may be defined as follows, for example.

TABLE 2-1

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1

Depends on UE capability.

Note 2

If the BWP switch involves changing of SCS, the BWP switch delay is determined by the larger one between the SCS before BWP switch and the SCS after BWP switch.

The requirements for the BWP switch time support type 1 or type 2 depending on UE capability. The UE may report a BWP delay time type that is supportable to the base station.

When the UE receives the DCI including the BWP switch indicator in slot n according to the requirements for the BWP switch delay time, the UE may complete a switch to a new BWP indicated by the BWP switch indicator at a time not later than slot n+$T_{BWP}$, and may perform transmission and reception with respect to a data channel scheduled by the corresponding DCI in the switched new BWP. When the base station intends to schedule the data channel to the new BWP, the base station may determine a time domain resource assignment for the data channel by taking into account the BWP switch delay time ($T_{BWP}$) of the UE. That is, when the base station schedules the data channel to the new BWP, the method, performed by the base station, of determining the time domain resource assignment for the data channel may include scheduling the corresponding data channel after the BWP switch delay time. Therefore, the UE may not expect the DCI indicating the BWP switch to indicate a slot offset (K0 or K2) value less than the BWP switch delay time ($T_{BWP}$).

When the UE receives the DCI (for example, DCI format 1_1 or 0_1) indicating the BWP switch, the UE may not perform transmission or reception during a time interval from a third symbol of the slot where the PDCCH including the DCI is received to a start time of the slot indicated by the slot offset (K0 or K2) value indicated by the time domain resource assignment indicator field in the DCI. For example, when the UE has received the DCI indicating the BWP switch in slot n and the slot offset value indicated by the DCI is K, the UE may not perform transmission or reception from the third symbol of the slot n to the symbol prior to slot n+K (i.e., the last symbol of slot n+K−1).

Next, a synchronization signal (SS)/PBCH block in 5G will be described.

The SS/PBCH block may refer to a physical layer channel block including a primary SS (PSS), a secondary SS (SSS), and a PBCH. Specifically, the SS/PBCH block is as follows:

PSS: A signal that is a reference for DL time/frequency synchronization and provides some information of a cell ID.

SSS: A signal that is a reference for DL time/frequency synchronization and provides the remaining cell ID information that is not provided by the PSS. In addition, the SSS may serve as a reference signal for demodulation of the PBCH.

PBCH: A channel that provides essential system information necessary for transmitting and receiving a data channel and a control channel of a UE. The essential system information may include search space related control information indicating radio resource mapping information of a control channel, scheduling control information for a separate data channel for transmitting system information, and the like.

SS/PBCH block: The SS/PBCH block includes a combination of a PSS, an SSS, and a PBCH. One or more SS/PBCH blocks may be transmitted within 5 ms, and the one or more transmitted SS/PBCH blocks may be identified by indices.

The UE may detect the PSS and the SSS in the initial access operation and may decode the PBCH. The UE may obtain the MIB from the PBCH and may be configured with the control resource set (CORESET) #0 (which may correspond to the control resource set having the CORESET index of 0) therefrom. The UE may monitor the control resource set #0 on the assumption that a demodulation reference signal (DMRS) transmitted in the selected SS/PBCH block and the control resource set #0 is quasi-colocated (QCLed). The UE may receive system information by using DL control information transmitted from the control resource set #0. The UE may obtain, from the received system information, configuration information related to a random access channel (RACH) necessary for initial access. The UE may transmit a physical RACH (PRACH) to the base station by taking into account the selected SS/PBCH index, and the base station having received the PRACH may obtain information about an SS/PBCH block index selected by the UE. The base station may know which block is selected among the SS/PBCH blocks by the UE and may know the fact that the control resource set #0 associated therewith is monitored.

Next, DCI in a 5G system will be described in detail.

In the 5G system, scheduling information about UL data (or PUSCH) or DL data (or PDSCH) is transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be transmitted through a PDCCH after channel coding and modulation is performed thereon. A cyclic redundancy check (CRC) may be attached to a DCI message payload. The CRC may be scrambled by a radio network temporary identifier (RNTI) corresponding to the identity of the UE. Different RNTIs may be used according to the purpose of the DCI message, for example, a UE-specific data transmission, a power control command, or a random access response. That is, the RNTI is not explicitly transmitted, but is included in a CRC calculation process and then transmitted. When receiving a DCI message transmitted on the PDCCH, the UE may check a CRC by using an assigned RNTI. When a CRC check result is correct, the UE may know that the corresponding message has been transmitted to the UE.

For example, a DCI that schedules a PDSCH for system information (SI) may be scrambled by an SI-RNTI. A DCI that schedules a PDSCH for a random access response (RAR) message may be scrambled by an RA-RNTI. A DCI that schedules a PDSCH for a paging message may be scrambled by a P-RNTI. A DCI that notifies a slot format indicator (SFI) may be scrambled by an SFI-RNTI. A DCI that notifies transmit power control (TPC) may be scrambled by a TPC-RNTI. A DCI that schedules UE-specific PDSCH or PUSCH may be scrambled by a C-RNTI (cell RNTI).

A DCI format 0_0 may be used as a fallback DCI that schedules a PUSCH. In this case, a CRC may be scrambled by a C-RNTI. The DCI format 0_0 in which the CRC is scrambled by the C-RNTI may include, for example, the following information.

TABLE 3

- Identifier for DCI formats - [1] bit
- Frequency domain resource assignment -
  $\lceil \log_2(N_{RB}^{UL,BWP}(N_{RB}^{UL,BWP}+1)/2) \rceil$ ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator (UL/ supplementary UL) indicator) - 0 or 1 bit A DCI format 0_1 may be used as a non-fallback DCI that schedules a PUSCH. In this case, a CRC may be scrambled by a C-RNTI. The DCI format 0_1 in which the CRC is scrambled by the C-RNTI may include, for example, the following information.

TABLE 4

- Carrier indicator – 0 or 3 bits
- UL/SUL indicator – 0 or 1 bit
- Identifier for DCI formats – [1] bits
- Bandwidth part indicator – 0, 1 or 2 bits
- Frequency domain resource assignment
  • For resource allocation type 0, $\lceil N_{RB}^{UL,BWP}/P \rceil$ bits
  • For resource allocation type 1, $\lceil \log_2(N_{RB}^{UL,BWP}(N_{RB}^{UL,BWP}+1)/2) \rceil$ bits TABLE 4-continued

- Time domain resource assignment –1, 2, 3, or 4 bits
- VRB-to-PRB mapping (virtual resource block-to- physical resource block mapping) – 0 or 1 bit, only for resource allocation type 1.
  • 0 bit if only resource allocation type 0 is configured;
  • 1 bit otherwise.
- Frequency hopping flag – 0 or 1 bit, only for resource allocation type 1.
  • 0 bit if only resource allocation type 0 is configured;
  • 1 bit otherwise.
- Modulation and coding scheme – 5 bits
- New data indicator – 1 bit
- Redundancy version – 2 bits
- HARQ process number – 4 bits
- 1st downlink assignment index – 1 or 2 bits
  • 1 bit for semi-static HARQ-ACK codebook;
  • 2 bits for dynamic HARQ-ACK codebook with single HARQ-ACK codebook.
- 2nd downlink assignment index – 0 or 2 bits
  • 2 bits for dynamic HARQ-ACK codebook with two HARQ-ACK sub-codebooks;
  • 0 bit otherwise.
- TPC command for scheduled PUSCH – 2 bits

- SRS resource indicator – $\left\lceil \log_2\left(\sum_{k=1}^{L_{max}} \binom{N_{SRS}}{k}\right) \right\rceil$ or $\lceil \log_2(N_{SRS}) \rceil$ bits

• $\left\lceil \log_2\left(\sum_{k=1}^{L_{max}} \binom{N_{SRS}}{k}\right) \right\rceil$ bits for non-codebook based PUSCH transmission;

• $\lceil \log_2(N_{SRS}) \rceil$ bits for codebook based PUSCH transmission.
- Precoding information and number of layers – up to 6 bits
- Antenna ports – up to 5 bits
- SRS request – 2 bits
- CSI request – 0, 1, 2, 3, 4, 5, or 6 bits
- CBG transmission information (code block group transmission information) – 0, 2, 4, 6, or 8 bits
- PTRS-DMRS association (phase tracking reference signal – demodulation reference signal association)– 0 or 2 bits.
- beta_offset indicator – 0 or 2 bits
- DMRS sequence initialization – 0 or 1 bit A DCI format 1_0 may be use as a fallback DCI tat schedules a PUSCH. In tis case, a CRC may be scrambled by a C-RNTI. The DCI format 1_0 in which the CRC is scrambled by the C-RNTI may include, for example, the following information.

TABLE 5

- Identifier for DCI formats - [1] bit
- Frequency domain resource assignment -$\lceil \log_2(N_{RB}^{DL,BWP}(N_{RB}^{DL,BWP}+1)/2) \rceil$ ] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- physical uplink control channel (PUCCH) resource indicator - 3 bits
- PDSCH-to-HARQ feedback timing indicator- [3] bits A DCI format 1_1 may be used as a non-fallback DCI that schedules a PDSCH. In this case, a CRC may be scrambled by a C-RNTI. The DCI format 1_1 in which the CRC is scrambled by the C-RNTI may include, for example, the following information.

TABLE 6

- Carrier indicator - 0 or 3 bits
- Identifier for DCI formats - [1] bits
- Bandwidth part indicator - 0, 1 or 2 bits
- Frequency domain resource assignment
    • For resource allocation type 0, $\lceil N_{RB}^{DL,BWP} / P \rceil$ bits
    • For resource allocation type 1, $\lceil \log_2(N_{RB}^{DL,BWP}(N_{RB}^{DL,BWP} + 1)/2) \rceil$ bits
- Time domain resource assignment -1, 2, 3, or 4 bits
- VRB-to-PRB mapping - 0 or 1 bit, only for resource allocation type 1.
    • 0 bit if only resource allocation type 0 is configured;
    • 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit Hereinafter, a method of allocating a time domain resource for a data channel in a 5G communication system will be described.

The base station may configure a table for time domain resource allocation information for a PDSCH and a PUSCH to the UE through higher layer signaling (e.g., RRC signaling). For the PDSCH, a table including a maximum of maxNrofDL-Allocations (=16) entries may be configured. For the PUSCH, a table including a maximum of maxNrofUL-Allocations (=16) entries may be configured. The time domain resource allocation information may include, for example, a PDCCH-to-PDSCH slot timing (K0) (corresponding to a time interval of slot unit between the time when the PDCCH is received and the time when the PDSCH scheduled by the received PDCCH is transmitted), a PDCCH-to-PUSCH slot timing (K2) (corresponding to a time interval of slot unit between the time when the PDCCH is received and the time when the PUSCH scheduled by the received PDCCH is transmitted), information about the location and length of a start symbol for which a PDSCH or a PUSCH is scheduled in a slot, a PDSCH or PUSCH mapping type, and the like. For example, information shown in the following tables may be notified from the base station to the UE.

TABLE 7

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
  k0 INTEGER(0..32) OPTIONAL, -- Need S
  (PDCCH-to-PDSCH timing, slot unit)
    mappingType ENUMERATED {typeA, typeB},
  (PDSCH mapping type)
    startSymbolAndLength INTEGER (0..127)
    (start symbol and length of PDSCH)
}

TABLE 8

PUSCH-TimeDomainResourceAllocation information element
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
  k2 INTEGER(0..32) OPTIONAL, -- Need S TABLE 8-continued

```
(PDCCH-to-PUSCH timing, slot unit)
mappingType ENUMERATED {typeA, typeB},
(PUSCH mapping type)
startSymbolAndLength INTEGER (0..127)
(start symbol and length of PUSCH)
}
```

The base station may notify the UE of one of the entries in the table for the time domain resource allocation information through L1 signaling (e.g., DCI) (for example, this may be indicated by a "time domain resource allocation" field in the DCI). The UE may obtain the time domain resource allocation information for the PDSCH or the PUSCH based on the DCI received from the base station.

Hereinafter, a DL control channel in a 5G communication system will be described in more detail with reference to the accompanying drawings.

Figure 4:
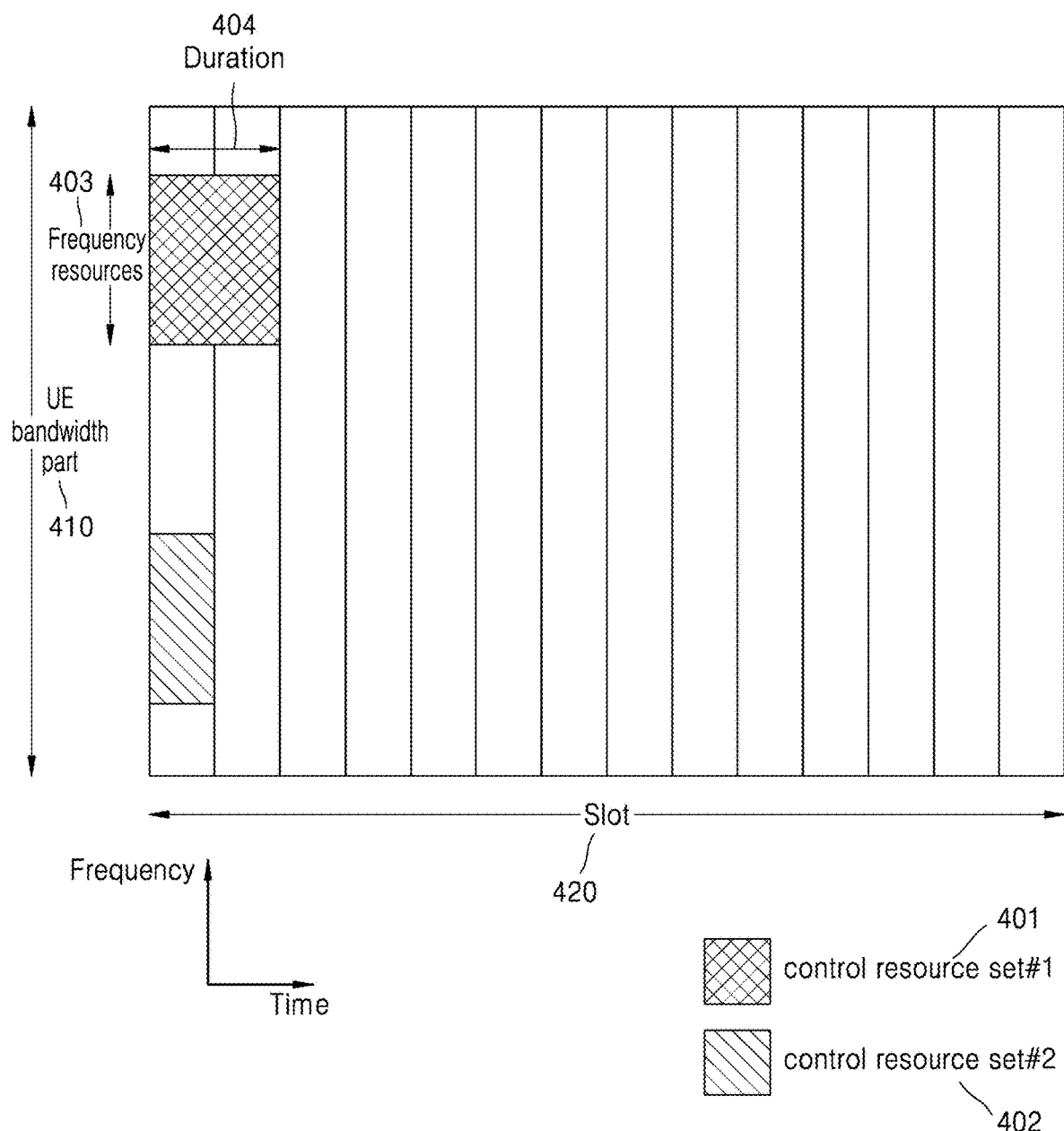
FIG. 4 illustrates a diagram illustrating an example of configuring a control resource set of a downlink control channel in the 5G system.

FIG. 4 illustrates a diagram illustrating an example of a control resource set (CORESET) in which a DL control channel is transmitted in a 5G wireless communication system. FIG. 4 illustrates an example in which a UE BWP 410 is configured on a frequency axis and two control resource sets (control resource set #1 401 and control resource set #2 402) are configured in one slot 420 on a time axis. The control resource sets 401 and 402 may be configured to specific frequency resources 403 within the entire UE BWP 410 on the frequency axis. One or more OFDM symbols may be configured on the time axis and may be defined as a control resource set duration 404. Referring to the example illustrated in FIG. 4, the control resource set #1 401 is configured with the control resource set duration of two symbols, and the control resource set #2 402 is configured with the control resource set duration of one symbol.

The base station may configure the control resource set of 5G to the UE through higher layer signaling (for example, SI, MIB, and RRC signaling). Configuring the control resource set to the UE means providing information such as a control resource set identity, a frequency location of the control resource set, a symbol duration of the control resource set, and the like. For example, the following information may be included.

TABLE 9

```
ControlResourceSet ::=                    SEQUENCE {
    -- Corresponds to L1 parameter 'CORESET-ID'
    controlResourceSetId                  ,
    (control resource set Identity)
        frequencyDomainResources          BIT STRING (SIZE (45)),
    (frequency domain resource assignment information)
        duration                          INTEGER (1..maxCoReSetDuration),
    (time domain resource assignment information)
        cce-REG-MappingType               CHOICE {
    (CCE-to-REG mapping type)
            interleaved                   SEQUENCE {
                reg-BundleSize            ENUMERATED {n2, n3, n6},
    (REG bundle size)
                precoderGranularity       ENUMERATED {sameAsREG-
            bundle, allContiguousRBs},
                interleaverSize           ENUMERATED {n2, n3, n6}
                (interleaver size)
                shiftIndex
                    INTEGER(0..maxNrofPhysicalResourceBlocks-1)
                    OPTIONAL
                (interleaver shift)
        },
            nonInterleaved                NULL
        },
        tci-StatesPDCCH                   SEQUENCE(SIZE (1..maxNrofTCI-
            StatesPDCCH)) OF TCI-StateId        OPTIONAL,
    (QCL configuration information)
        tci-PresentInDCI                  ENUMERATED {enabled}
                                              OPTIONAL, -- Need S
}
```

In Table 9, tci-StatesPDCCH (simply referred to as transmission configuration indication (TCI) state) configuration information may include information about one or more SS/PBCH block indices having a QCLed relationship with a DMRS transmitted in the corresponding control resource set or a channel state information reference signal (CSI-RS) Index.

Figure 5:
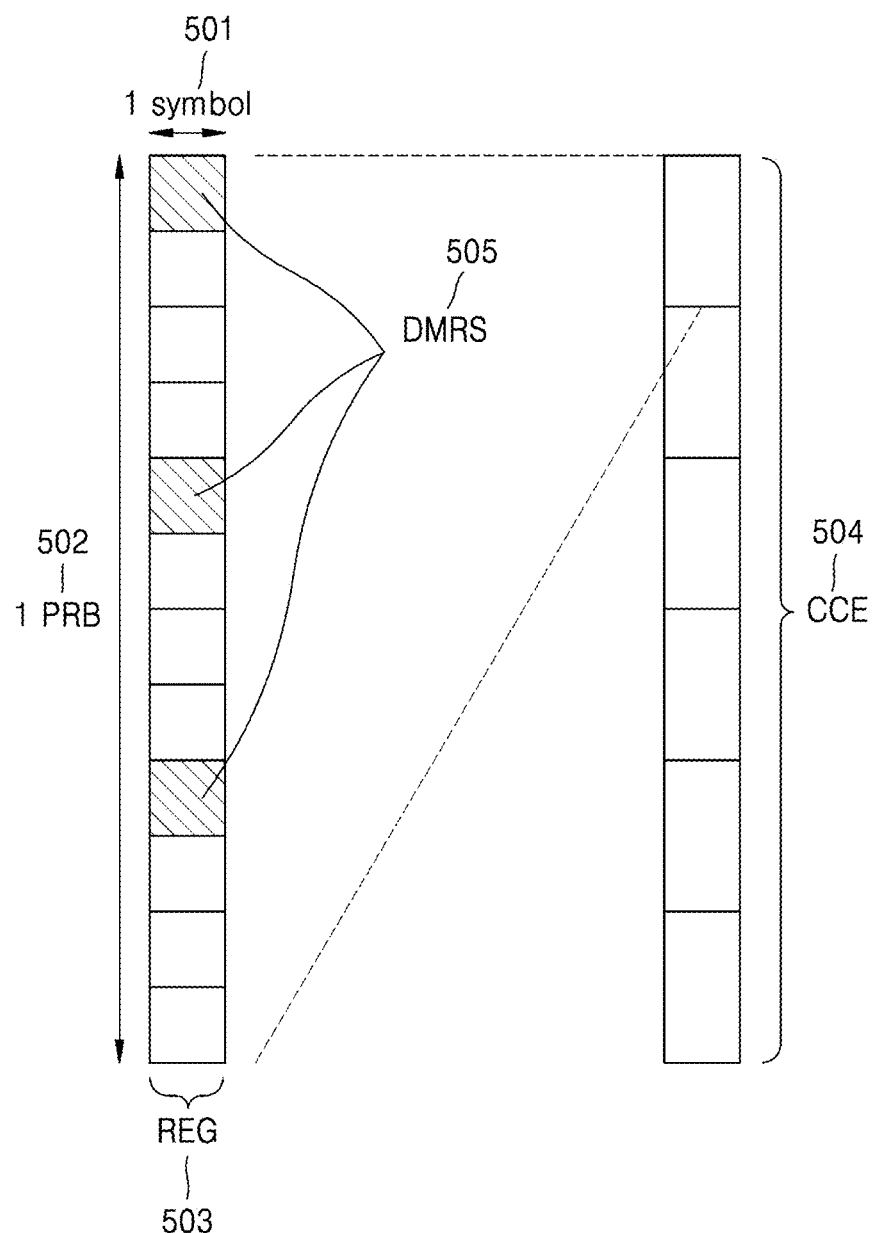
FIG. 5 illustrates a diagram illustrating a structure of a downlink control channel in the 5G system.

FIG. 5 illustrates a diagram illustrating an example of a basic unit of time and frequency resources constituting a DL control channel that is usable in 5G. Referring to FIG. 5, the basic unit of the time and frequency resources constituting the control channel may be referred to as a resource element group (REG) 503. The REG 503 may be defined by one OFDM symbol 501 on a time axis and one physical resource block (PRB) 502, that is, 12 subcarriers, on a frequency axis. The base station may concatenate the REG 503 to configure a DL control channel assignment unit.

As illustrated in FIG. 5, when a basic unit to which a DL control channel is assigned in 5G is referred to as a control channel element (CCE) 504, one CCE 504 may include a plurality of REGs 503. In the example illustrated in FIG. 5, the REG 503 may include 12 resource elements (REs), and when one CCE 504 includes six REGs 503, one CCE 504 may include 72 REs. When the DL control region (e.g., DL control resource set) is configured, the DL control region may include a plurality of CCEs 504. A specific DL control channel may be transmitted after being mapped to one or more CCEs 504 according to an aggregation level (AL) in the DL control region. The CCEs 504 in the control region are distinguished by numbers. In this case, the numbers of the CCEs 504 may be assigned according to a logical mapping scheme.

The basic unit of the DL control channel illustrated in FIG. 5, that is, the REG 503, may include both REs to which the DCI is mapped and a region to which the DMRS 505, which is the reference signal for decoding the DCI, is mapped. As illustrated in FIG. 5, three DMRSs 505 may be transmitted in one REG 503. The number of CCEs necessary for transmitting the PDCCH may be 1, 2, 4, 8, or 16 according to the AL. A different number of CCEs may be used to implement link adaptation of the DL control channel. For example, when AL=L, one DL control channel may be transmitted through L CCEs. The UE has to detect a signal in a state in which the UE does not know information about the DL control channel, and a search space representing a set of CCEs is defined for blind decoding. The search space is a set of DL control channel candidates including CCEs that the UE has to attempt to decode at a given AL. Because there are various ALs that make one bundle from 1, 2, 4, 8, or 16 CCEs, the UE may have a plurality of search spaces. A search space set may be defined as a set of search spaces at all configured ALs.

The search spaces may be classified into common search spaces and UE-specific search spaces. A certain group of UEs or all the UEs may examine the common search space of the PDCCH so as to receive cell common control information such as dynamic scheduling of system information or a paging message. For example, PDSCH scheduling assignment information for transmission of the SIB including cell operator information and the like may be received by examining the common search space of the PDCCH. In the case of the common search space, because a certain group of UEs or all the UEs have to receive the PDCCH, the common search space may be defined as a set of previously appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured from the base station to the UE through higher layer signaling (e.g., SIB, MIB, RRC signaling, etc.). For example, the base station may configure, to the IE, the number of PDCCH candidates at each AL L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the parameters for the search space of the PDCCH may include the following information.

TABLE 10

```
SearchSpace ::=                          SEQUENCE {
    -- Identity of the search space. SearchSpaceId = 0 identifies the SearchSpace
       configured via PBCH (MIB) or ServingCellConfigCommon.
    searchSpaceId                        SearchSpaceId,
    (search space ID)
    controlResourceSetId                 ControlResourceSetId,
    (control resource set ID)
    monitoringSlotPeriodicityAndOffset   CHOICE {
    (monitoring slot level periodicity)
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0..15),
        sl20                             INTEGER (0..19)
    }
                                         OPTIONAL,
    duration (monitoring duration) INTEGER (2..2559)
        monitoringSymbolsWithinSlot          BIT STRING (SIZE (14))
                                             OPTIONAL,
    (monitoring symbol within slot)
        nrofCandidates                   SEQUENCE {
    (number of PDCCH candidates for each aggregation level)
            aggregationLevel1            ENUMERATED {n0, n1, n2, n3, n4,
    n5, n6, n8},
            aggregationLevel2            ENUMERATED {n0, n1, n2, n3, n4,
    n5, n6, n8},
            aggregationLevel4            ENUMERATED {n0, n1, n2, n3, n4,
    n5, n6, n8},
            aggregationLevel8            ENUMERATED {n0, n1, n2, n3, n4,
    n5, n6, n8},
            aggregationLevel16           ENUMERATED {n0, n1, n2, n3, n4,
    n5, n6, n8}
        },
        searchSpaceType                  CHOICE {
    (search space type)
        -- Configures this search space as common search space to (CSS) and DCI formats
           to monitor.
```

TABLE 10-continued

| | |
|---|---|
| common<br>(common search space)<br>} | SEQUENCE { |
| ue-Specific<br>(UE-specific search space)<br>-- Indicates whether the UE monitors in this USS for DCI formats 0-0 and 1-0<br>or for formats 0-1 and 1-1.<br>formats<br>0, formats0-1-And-1-1},<br>...<br>} | SEQUENCE {<br><br><br><br>ENUMERATED {formats0-0-And-1-<br> |

The base station may configure one or more search space sets to the UE according to configuration information. According to an embodiment of the disclosure, the base station may configure a search space set 1 and a search space set 2 to the UE. The base station may configure the search space set 1 to the UE so that DCI format A scrambled by an X-RNTI is monitored in the common search space. The base station may configure the search space set 2 to the UE so that DCI format B scrambled by a Y-RNTI is monitored in the UE-specific search space.

According to the configuration information, one or more search space sets may be present in the common search space or the UE-specific search space. For example, a search space set #1 and a search space set #2 may be configured as the common search space, and a search space set #3 and a search space set #4 may be configured as the UE-specific search space.

In the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

C-RNTI (Cell RNTI): For UE-specific PDSCH scheduling

TC-RNTI (Temporary Cell RNTI): For UE-specific PDSCH scheduling

CS-RNTI (Configured Scheduling RNTI): For semi-statically configured UE-specific PDSCH scheduling RA-RNTI (Random Access RNTI): For PDSCH scheduling in random access operation P-RNTI (Paging RNTI): For PDSCH scheduling in which paging is transmitted SI-RNTI (System Information RNTI): For PDSCH scheduling in which system information is transmitted INT-RNTI (Interruption RNTI): For notifying whether to puncture PDSCH TPC-PUSCH-RNTI (Transmit Power Control for PUSCH RNTI): For indication of power control command for PUSCH TPC-PUCCH-RNTI (Transmit Power Control for PUCCH RNTI): For indication of power control command for PUCCH TPC-SRS-RNTI (Transmit Power Control for SRS RNTI): For indication of power control command for SRS The above-described specified DCI formats may follow the definitions below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the AL L in the control resource set p and the search space set s may be expressed by the following equation.

$$L \cdot \left\{ \left( Y_{p,n_{s,f}^\mu} + \left\lfloor \frac{m_{s,n_{CI}} \cdot N_{CCE,p}}{L \cdot M^{(L)}_{p,s,max}} \right\rfloor + n_{CI} \right) \mod \lfloor N_{CCE,p}/L \rfloor \right\} + i \quad \text{[Equation 1]}$$

L: aggregation level (AL)

$n_{CI}$: carrier index $N_{CCE,p}$: total number of CCEs present in control resource set p $n_{\mu s,f}$: slot index $M^{(L)}_{p,s,max}$: number of PDCCH candidates of AL L $m_{snCI}=0, \ldots, M^{(L)}_{p,s,max}-1$: PDCCH candidate index of AL L $i=0, \ldots, L-1$ $Y_{p,n_s,f}^\mu=(A_p \cdot Y_{p,n_s,f^\mu-1}) \mod D$, $Y_{p,-1}=n_{RNTI} \ne 0$, $A_0=39827$, $A_1=39829$, $A_2=39839$, $D=65537$ $n_{RNTI}$: UE ID The Y_(p,n$^\mu_{s,f}$) value may correspond to zero in the common search space.

In the case of the UE-specific search space, the Y_(p,n$^\mu_{s,f}$) value may correspond to a value that changes according to the UE identity (C-RNTI or ID configured by the base station to the UE) and the time index.

In 5G, because a plurality of search space sets are configurable with different parameters (e.g., parameters of Table 8), a group of search space sets monitored by the UE may be changed at each time. For example, when the search space set #1 is configured with an X-slot periodicity, the search space set #2 is configured with a Y-slot periodicity, and X and Y are different from each other, the UE may monitor both the search space set #1 and the search space set #2 in a specific slot, or may monitor one of the search space set #1 and the search space set #2 in a specific slot.

When a plurality of search space sets are configured in the UE, the following conditions may be considered in the method of determining the search space set to be monitored by the UE.

[Condition 1: Limitation to Maximum Number of PDCCH Candidates]

The number of PDCCH candidates capable of being monitored per slot does not exceed $M^\mu$. $M^\mu$ may be defined as the maximum number of PDCCH candidates per slot in a cell configured with a subcarrier spacing of 15·2 μkHz and may be defined as shown in the following table.

TABLE 12

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limitation to Maximum Number of CCEs]

The number of CCEs constituting the entire search space per slot does not exceed $C^\mu$ (in this case, the entire search space refers to the entire set of CCEs corresponding to the union area of the search space sets). C may be defined as the maximum number of CCEs per slot in a cell configured with a subcarrier spacing of 15·2 μkHz and may be defined as shown in the following table.

TABLE 13

| μ | Maximum number of CCEs per slot and per serving cell ($C^\mu$) |
|---|---|
| 0 | 56 |
| 1 | 56 |
| 2 | 48 |
| 3 | 32 |

For convenience of description, a situation in which both of Conditions 1 and 2 are satisfied at a specific time is defined as "Condition A." Therefore, not satisfying Condition A may mean not satisfying at least one of Condition 1 or Condition 2.

Condition A may not be satisfied at a specific time according to the configuration of the search space sets of the base station. When Condition A is not satisfied at a specific time, the UE may select and monitor only part of the search space sets configured to satisfy Condition A at a corresponding time, and the base station may transmit a PDCCH by using the selected search space set.

As a method of selecting some search spaces from the entire configured search space sets, the following method may be followed.

[Method 1]

When Condition A for PDCCH is not satisfied at a specific time (slot), the UE (or the base station) may preferentially select a search space set, in which a search space type is configured as a common search space among search space sets existing at a corresponding time, over a search space set configured as a UE-specific search space.

When all the search space sets configured as the common search space are selected (that is, when Condition A is satisfied even after selecting all the search spaces configured as the common search space), the UE (or the base station) may select the search space sets configured as the UE-specific search space. In this case, when there are a plurality of search space sets configured as the UE-specific search space, a search space set having a lower search space set index may have a higher priority. The UE-specific search space sets may be selected within a range in which Condition A is satisfied, by taking into account the priority.

Figure 6:
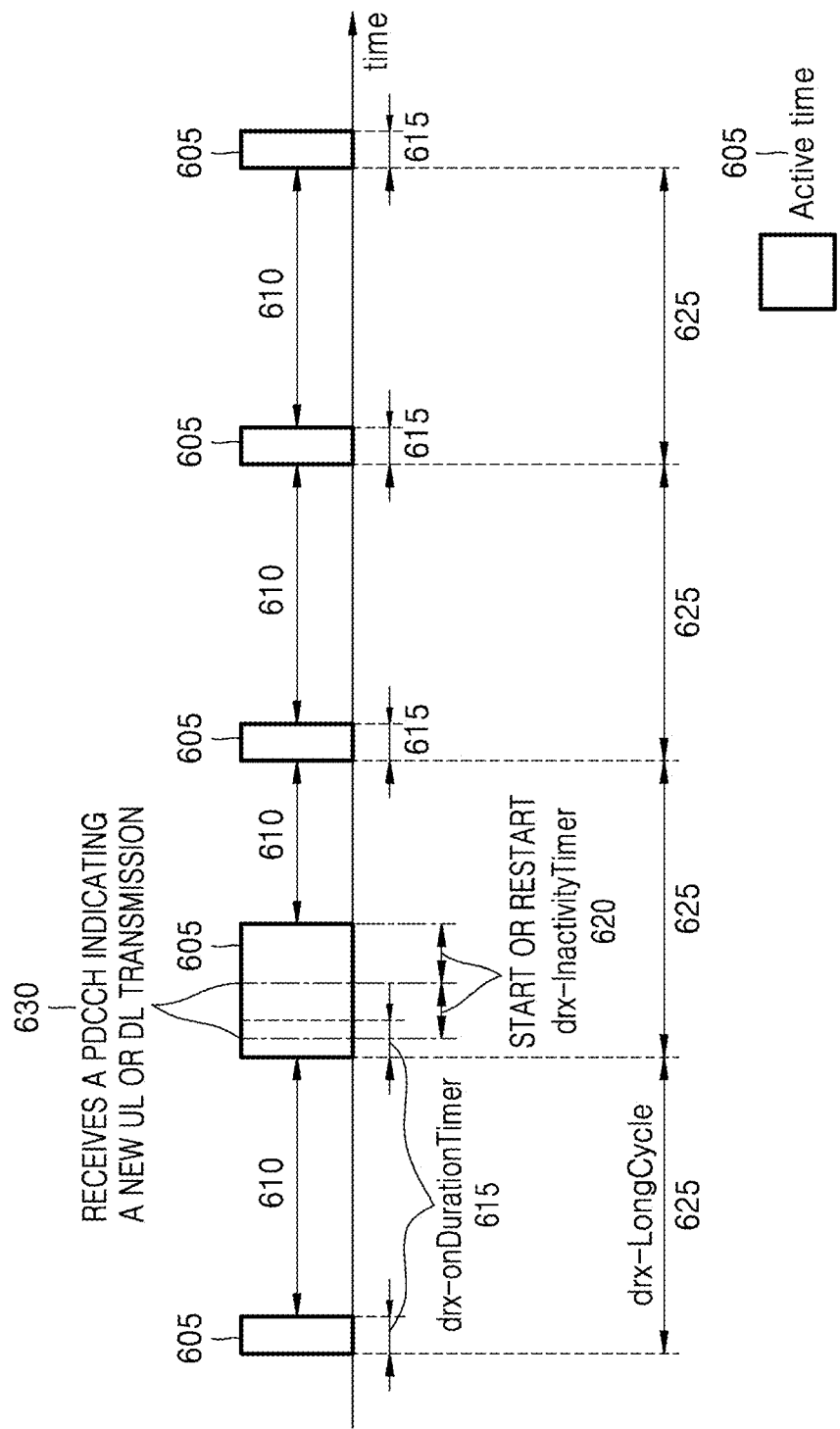
FIG. 6 illustrates a diagram illustrating an example of a discontinuous reception (DRX) operation of the 5G system.

FIG. 6 illustrates a diagram for describing discontinuous reception (DRX).

The DRX is an operation in which the UE that is using a service discontinuously receives data in an RRC connected state in which a radio link is established between the base station and the UE. When the DRX is applied, the UE turns on a receiver at a specific time to monitor a control channel and turns off the receiver when no data is received during a certain period, such that the power consumption of the UE may be reduced. The DRX operation may be controlled by a medium access control (MAC) layer based on various parameters and a timer.

Referring to FIG. 6, an active time 605 is a time when the UE wakes up every DRX cycle and monitors the PDCCH. The active time 605 may be defined as follows:

drx-onDurationTimer or drx-InactivityTimer or drx-RetransmissionTimerDL or drx-RetransmissionTimerUL or ra-ContentionResolutionTimer is running, or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, etc. are timers of which the values are configured by the base station, and have a function of configuring the UE to monitor the PDCCH in a situation in which a certain condition is satisfied.

drx-onDurationTimer 615 is a parameter for configuring a minimum time for which the UE is awake in a DRX cycle. drx-InactivityTimer 620 is a parameter for additionally configuring a wake-up time when the UE receives a PDCCH indicating a new UL transmission or DL transmission (630). drx-RetransmissionTimerDL is a parameter for configuring a maximum time for which the UE is awake so as to receive DL retransmission in a DL HARQ procedure. drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerUL may be configured as, for example, the time, the number of subframes, the number of slots, and the like. ra-ContentionResolutionTimer is a parameter for monitoring the PDCCH in a random access procedure.

inActive time 610 is a time configured not to monitor the PDCCH during the DRX operation and/or a time configured not to receive the PDCCH, and the remaining time excluding the active time 605 from the entire time of performing the DRX operation may become the inActive time 610. When the PDCCH is not monitored for the active time 605, the UE may enter a sleep or inActive state to reduce power consumption.

The DRX cycle refers to a cycle in which the UE wakes up and monitors the PDCCH. That is, the DRX cycle refers to a time interval or on duration until the UE monitors next PDCCH after monitoring the PDCCH. There are two types of the DRX cycle: short DRX cycle and long DRX cycle. The short DRX cycle may be optionally applied.

A long DRX cycle 625 is a longer cycle between the two DRX cycles configured in the UE. The UE starts the drx-onDurationTimer 615 again when the time has elapsed from the start point (e.g., start symbol) of the drx-onDurationTimer 615 by the long DRX cycle 625 while operating in long DRX. When operating in the long DRX cycle 625, the UE may start the drx-onDurationTimer 615 in a slot after drx-SlotOffset in a subframe satisfying [Equation 2] below. The drx-SlotOffset refers to a delay before the start of the drx-onDurationTimer 615. The drx-SlotOffset may be configured as, for example, the time, the number of slots, and the like.

$$[(SFN\ Y\ 10)+\text{subframe number}]\text{modulo}(drx\text{-Long-Cycle})=drx\text{-StartOffset} \quad [\text{Equation 2}]$$

In this case, the drx-LongCycleStartOffset may include the long DRX cycle 625 and drx-StartOffset and may be used to define a subframe to start the long DRX cycle 625. The drx-LongCycleStartOffset may be configured as, for example, the time, the number of subframes, the number of slots, and the like.

The short DRX cycle is a shorter cycle between the two DRX cycles defined in the UE. When a certain event, for example, reception of a PDCCH indicating new UL transmission or DL transmission (630), occurs in the active time 605 while the UE is operating in the long DRX cycle 625, the UE starts or restarts the drx-InactivityTimer 620, and when the drx-InactivityTimer 620 has expired or a DRX command MAC control element (CE) is received, the UE may operate in the short DRX cycle. For example, in FIG. 6, the UE may start drx-ShortCycleTimer at the time when the previous drx-onDurationTimer 615 or drx-InactivityTimer 620 expires, and may operate in the short DRX cycle until drx-ShortCycleTimer expires. When the UE receives the PDCCH indicating the new UL transmission or DL transmission (630), the UE may expect additional UL transmission or DL transmission in the future and may extend the active time 605 or delay the arrival of the InActive Time 610. The UE starts the drx-onDurationTimer 615 again when the time has elapsed from the start point of the previous on duration by the short DRX cycle while operating in short DRX Subsequently, when the drx-ShortCycleTimer expires, the UE operates again in the long DRX cycle 625.

When operating in the short DRX cycle, the UE may start the drx-onDurationTimer 615 after drx-SlotOffset in a subframe satisfying [Equation 3] below. The drx-SlotOffset refers to a delay before the start of the drx-onDurationTimer 615. The drx-SlotOffset may be configured as, for example, the time, the number of slots, and the like.

$$[(SFN\ X\ 10)+\text{subframe number}]\text{modulo}(drx\text{-Short-Cycle})=(drx\text{-StartOffset})\text{modulo}(drx\text{-ShortCycle}) \quad [\text{Equation 3}]$$

The drx-ShortCycle and the drx-StartOffset may be used to define a subframe to start the short DRX cycle. The drx-ShortCycle and the drx-StartOffset may be configured as, for example, the time, the number of subframes, the number of slots, and the like.

The DRX operation has been described with reference to FIG. 6. According to an embodiment of the disclosure, the UE may reduce power consumption of the UE by performing the DRX operation. However, even when the UE performs the DRX operation, the UE does not always receive the PDCCH associated with the UE in the active time 605. Therefore, in an embodiment of the disclosure, a signal for controlling the operation of the UE may be provided so as to more effectively save power of the UE.

Hereinafter, a carrier aggregation and scheduling method in a 5G communication system will be described in detail.

The UE may be configured with a plurality of cells (cells or component carriers (CCs)) from the base station and may be configured with whether to perform cross-carrier scheduling on the cells configured in the UE. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. At this time, the scheduled cell (cell A) and the scheduling cell (cell B) may be configured by different numerologies. The numerology may include subcarrier spacing, cyclic prefix, and the like. When the numerologies of cell A and cell B are different from each other, the following minimum scheduling offset may be additionally considered between the PDCCH and the PDSCH when the PDCCH of cell B schedules the PDSCH of cell A

[Cross-Carrier Scheduling Method]

When a subcarrier spacing ($\mu_B$) of cell B is less than a subcarrier spacing ($\mu_A$) of cell A, the PDSCH may be scheduled from a next PDSCH slot that corresponds to X symbols after the last symbol of the PDCCH received in cell B. X may be different according to $\mu_B$. X=4 symbols may be defined when $\mu_B$=15 kHz, X=4 symbols may be defined when $\mu_B$=30 kHz, and X=8 symbols may be defined when $\mu_B$=60 kHz.

When a subcarrier spacing ($\mu_B$) of cell B is greater than a subcarrier spacing ($\mu_A$) of cell A, the PDSCH may be scheduled from the time that corresponds to X symbols after the last symbol of the PDCCH received in cell B. X may be different according to $\mu_B$. X=4 symbols may be defined when $\mu_B$=30 kHz, X=8 symbols may be defined when $\mu_B$=60 kHz, and X=12 symbols may be defined when $\mu_B$=120 kHz.

Hereinafter, higher layer signaling may be signaling corresponding to at least one or the following signalings or a combination of one or more of the following signalings.

MIB (Master Information Block)
SIB (System Information Block) or SIB X (X=1, 2, . . . )
RRC (Radio Resource Control)
MAC (Medium Access Control) CE (Control Element)
UE Capability Reporting Also, L1 signaling may be signaling corresponding to at least one of the following physical layer channels or signaling methods or a combination of one or more of the following physical layer channels or signaling methods.

PDCCH (Physical Downlink Control Channel)
DCI (Downlink Control Information)
UE-specific DCI
Group common DCI
Common DCI
  Scheduling DCI (e.g., DCI used for scheduling DL or UL data)
  Non-scheduling DCI (e.g., DCI not used for scheduling DL or UL data)
PUCCH (Physical Uplink Control Channel)
UCI (Uplink Control Information)

First Embodiment

In a next generation mobile communication system, a base station may transmit an L1 signal to a UE so as to reduce power consumption of the UE. This may be referred to as a power saving signal (POSS). The POSS is not limited to the above-described example and may be expressed by various names such as a power control signal and a power setup signal. More specifically, in an embodiment of the disclosure, the POSS may be referred to as a wake-up signal (WUS), a power control signal, a DRX activation signal, an on duration activation signal, an on duration timer activation signal (drx-onDurationTimer activation signal), and the like.

According to an embodiment of the disclosure, the UE may monitor the PDCCH and detect DCI corresponding to the monitored POSS. A DCI format corresponding to the POSS may be referred to as DCI format 3_0. At this time, a CRC of DCI format 3_0 may be scrambled by a specific RNTI. The specific RNTI may be referred to as, for example, a PS (power saving)-RNTI. In the disclosure, "PS" may refer to power saving. Also, the PS-RNTI may be a newly defined RNTI or an existing RNTI. Alternatively, the UE may be configured with the PS-RNTI from the base station through higher layer signaling. The UE may receive DCI format 3_0 on the assumption that DCI format 3_0 corresponding to the POSS is scrambled by the PS-RNTI. In this case, when the UE performs blind decoding on DCI format 3_0, the UE may perform de-scrambling by using the PS-RNTI.

According to an embodiment of the disclosure, the UE may be configured with a search space to monitor DCI format 3_0 corresponding to the POSS from the base station through higher layer signaling. The base station may configure the search space for DCI format 3_0 corresponding to the POSS in the UE based on the parameters of [Table 10] described above. In summary, the following information may be configured.

[Search Space Configuration Information]
  Search space ID
  CORESET ID
  monitoringSlotPeriodicityAndOffset (slot level monitoring periodicity and offset)
  duration (monitoring duration): Number of consecutive slots that a SearchSpace lasts in every occasion, i.e., upon every period as given in the periodicity AndOffset. If the field is absent, the UE applies the value 1 slot, except for DCI format 2_0. The UE ignores this field for DCI format 2_0. The maximum valid duration is periodicity-1 (periodicity as given in the monitoringSlotPeriodicityAndOffset).
  monitoringSymbolsWithinSlot (monitoring occasion symbol within slot)
  nrofCandidates (number of PDCCH candidates for each aggregation level)
  searchSpaceType (search space type)
    common (common search space)
    ue-Specific (UE-specific search space)

According to an embodiment of the disclosure, the UE may determine a PDCCH monitoring occasion for the POSS based on search space configuration information for DCI format 3_0 corresponding to the POSS, which is received from the base station. The UE may perform blind decoding on each PDCCH monitoring occasion for the POSS. When the UE detects DCI format 3_0, the UE may perform a subsequent operation according to indication information in the detected DCI format 3_0. For example, the following control information may be included in DCI format 3_0.

First control information: an indicator that controls PDCCH monitoring operation in DRX occasion that is present after POSS monitoring occasion (or it may be expressed by an indicator indicating whether to wake up, ps-Index, etc.).
  As an example, when the value of this field indicates "0", the UE may not perform PDCCH monitoring in DRX active time that is subsequently present. (Alternatively, the UE may not start drx-onDurationTimer in DRX occasion that is subsequently present. The above-described operation corresponding to the field value "0" may correspond to an operation that the UE does not wake up.)
  As an example, when the value of this field indicates "1", the UE may perform PDCCH monitoring in DRX active time that is subsequently present. (Alternatively, the UE may start drx-onDurationTimer in DRX occasion that is subsequently present. The above-described operation corresponding to the field value "1" may correspond to an operation that the UE wakes up.)
Second control information: an indicator that indicates dormancy state or active state for secondary cell (SCell)
  The second control information may include an N-bit bitmap, and each bit of the bitmap may correspond to one secondary cell or one secondary cell group including a plurality of secondary cells.
  As an example, when "0" is indicated as one bit value of the bitmap, the UE may configure the cell state to the dormancy state for the secondary cell indicated by the corresponding bit or for all the secondary cells of the secondary cell group indicated by the corresponding bit.
  As an example, when "1" is indicated as one bit value of the bitmap, the UE may configure the cell state to the active state for the secondary cell indicated by the corresponding bit or for all the secondary cells of the secondary cell group indicated by the corresponding bit.
Third control information: an indicator that triggers aperiodic CSI reporting According to an embodiment of the disclosure, the UE may monitor the DCI format corresponding to the POSS only in an area other than DRX active time. More specifically, when the PDCCH monitoring occasion for the POSS configured in the UE is present in the time domain other than the DRX active time, the UE may determine that the corresponding PDCCH monitoring occasion is valid and may perform PDCCH monitoring for the POSS in the corresponding occasion. When the PDCCH monitoring occasion for the POSS configured in the UE is present in the time domain corresponding to the DRX active time, the UE may determine that the corresponding PDCCH monitoring occasion is invalid and may not perform PDCCH monitoring for the POSS in the corresponding occasion.

In an embodiment of the disclosure, the UE may determine that the PDCCH monitoring occasion for the POSS is invalid in the following situations.
  A case in which the PDCCH monitoring occasion for the configured POSS is present within the DRX active time
  A case in which there occurs a contention with another operation or physical channel of the UE (or a physical channel having higher priority or an operation related thereto) at a time corresponding to the PDCCH monitoring occasion for the configured POSS (for example, when overlapping SS/PBCH block or when overlapping a periodic/semi-permanently transmitted or received reference signal (e.g., a periodic/semi-permanent CSI-RS/SRS, etc.))

A case in which signaling of canceling the PDCCH monitoring operation in the PDCCH monitoring occasion for the configured POSS is received According to an embodiment of the disclosure, when the UE does not detect DCI format 3_0 in the PDCCH monitoring occasion for the configured POSS, the following operation may be performed.

When the UE has been configured with a fallback operation (or ps-fallback) from the base station through higher layer signaling, the UE may perform an operation according to the configuration of the base station. The base station may configure one of the following two operations in the UE as the fallback operation for the case in which DCI format 3_0 is not received.
First operation: monitoring PDCCH monitored in DRX active time that is subsequently present.
Second operation: not monitoring PDCCH in DRX active time that is subsequently present.
When the UE has not been configured with the fallback operation from the base station through higher layer signaling, the UE may not perform PDCCH monitoring in the DRX active time that is subsequently present.

According to an embodiment of the disclosure, the UE may be configured to monitor the POSS in a primary cell (PCell) or a primary secondary cell (PSCell) and may monitor the POSS based on the configuration information. All or part of the contents indicated by the POSS may be equally applied to all the secondary cells of the cell group to which the PCell (or PSCell) belongs (that is, a master cell group (MCG) in the case of the PCell and a secondary cell group (SCG) in the case of the PSCell). For example, when the UE monitors the POSS in the PCell and receives an indicator indicating wake-up through the received POSS, the UE may perform a wake-up operation on all primary cells and secondary cells existing in the MCG, and when the UE receives an indicator indicating not to wake up, the UE may not perform a wake-up operation on all primary cells and secondary cells existing in the MCG. Also, when the UE monitors the POSS in the PSCell and receives an indicator indicating wake-up through the received POSS, the UE may perform a wake-up operation on all primary secondary cells and secondary cells existing in the SCG, and when the UE receives an indicator indicating not to wake up, the UE may not perform a wake-up operation on all primary secondary cells and secondary cells existing in the SCG.

After detecting the DCI format by performing the POSS monitoring, the UE may perform a subsequent operation according to indication information in the received DCI format. At this time, the time required for the decoding operation for the PDCCH corresponding to the POSS of the UE and the time for preparation or warming up to perform the PDCCH monitoring in the subsequent DRX active time according to the indication contents of the DCI may be required. Considering this, the POSS monitoring occasion may be configured to be located before DRX on or active time (or, in the same manner, before the UE starts drx-onDurationTimer) by a specific time interval. That is, the PDCCH monitoring occasion for the POSS may be configured to be present at a time before a specific offset from the start time of each DRX occasion determined by the DRX cycle. An example of FIG. 7 illustrates that the PDCCH monitoring occasion for the POSS is located with an offset difference of a gap 706 before DRX on.

Hereinafter, various methods of determining or configuring the PDCCH monitoring occasion for DCI format 3_0 corresponding to the POSS are proposed.

$(1\text{-}1)^{st}$ Embodiment

Figure 7:
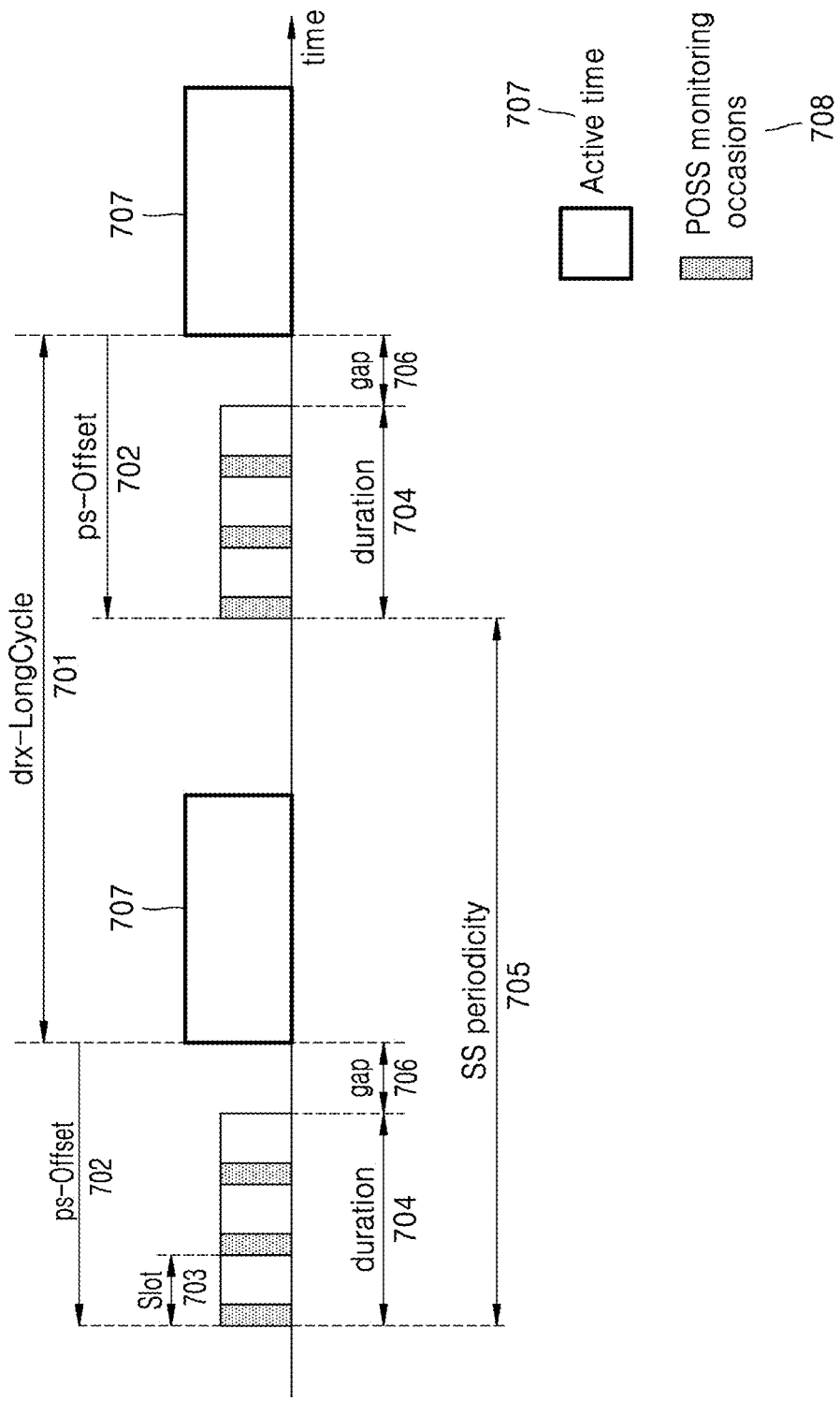
FIG. 7 illustrates a diagram illustrating an example of a power saving signal (POSS) configuring method according to an embodiment of the disclosure.

FIG. 7 illustrates a diagram illustrating an example of a method of configuring a PDCCH monitoring occasion for DCI format 3_0 corresponding to a POSS, according to a $(1\text{-}1)^{st}$ embodiment of the disclosure.

In some embodiments of the disclosure, a UE may be configured with a search space for a POSS (that is, a search space for DCI format 3_0 corresponding to the POSS) from a base station through higher layer signaling. The UE may receive, from the base station, the search space configuration information described in the first embodiment of the disclosure. For example, the UE may receive configuration information such as a monitoring duration 704, a slot level monitoring periodicity 705, and an offset (monitoringSlotPeriodicityAndOffset).

The UE may determine that the PDCCH monitoring occasion for the POSS is present in each consecutive slot corresponding to the configured monitoring duration 704 for every configured periodicity 705 according to the search space configuration information for the POSS. For example, when X slots, Y slots, and Z slots are respectively configured as the periodicity 705, the offset, and the duration 704 by the monitoringSlotPeriodicityAndOffset value, the UE may determine that the PDCCH monitoring occasion is present for a total of Z slots (that is, $\{Y, Y+1, Y+2, \ldots, Y+Z-1\}^{th}$ slots) starting from the Y-th slot of the time interval that exists for every X slot periodicity.

In some embodiments of the disclosure, the UE may be configured with a ps-offset value (ps-Offset) 702 corresponding to an offset from the start time of the DRX active time 707 (or the DRX on start time) to the start time of the PDCCH monitoring occasion for the POSS, from the base station through higher layer signaling. That is, the UE may determine that the PDCCH monitoring occasion for the POSS starts from a time earlier than the start time of the DRX active time 707 by the ps-offset value 702. The UE may determine that the PDCCH monitoring occasion is present as many as the slots configured as the monitoring duration 704 from the start time of the PDCCH monitoring occasion for the POSS.

In some embodiments of the disclosure, the start time (or start slot) of the PDCCH monitoring occasion for the POSS may be determined by the ps-offset value 702, may be determined by the offset value configured by monitoringSlotPeriodicityAndOffset in the search space configuration, or may be determined by both the ps-offset value 702 and the offset value configured by the monitoringSlotPeriodicityAndOffset. For example, the start time of the PDCCH monitoring occasion for the POSS may be determined by at least one of the following methods or a combination of one or more of the following methods.

[Method 1] When the ps-offset value 702 is configured and the monitoringSlotPeriodicityAndOffset is configured, the UE may ignore the value of monitoringSlotPeriodicityAndOffset and determine the start time of the PDCCH monitoring occasion for the POSS by using the ps-offset value 702.

[Method 2] When the ps-offset value 702 is configured and the monitoringSlotPeriodicityAndOffset is not configured, the UE may determine the start time of the PDCCH monitoring occasion for the POSS by using the ps-offset value 702.

[Method 3] When the ps-offset value 702 is not configured and monitoringSlotPeriodicityAndOffset is configured, the UE may determine the start time of the PDCCH monitoring occasion for the POSS by using an offset value indicated by the monitoringSlotPeriodicityAndOffset.

[Method 4] When the ps-offset value 702 is configured and monitoringSlotPeriodicityAndOffset is configured, the UE may determine the start time of the PDCCH monitoring occasion for the POSS by combining the ps-offset value 702 and the offset value indicated by the monitoringSlotPeriodicityAndOffset, unlike [Method 1]. For example, the UE may first determine the PDCCH monitoring occasion of the search space for the POSS by using the offset value indicated by the monitoringSlotPeriodicityAndOffset. Next, the UE may determine, as the start time, the PDCCH monitoring occasion present at the closest, earliest or latest time among the determined PDCCH monitoring occasions that are present after the time indicated by the ps-offset value 702.

In some embodiments of the disclosure, the UE may be configured with one or more search spaces for the POSS from the base station through higher layer signaling, and may be configured with each ps-offset value 702 to be applied for each search space, respectively. For example, the UE may be configured with a search space X and a search space Y for the POSS, and may be configured with an offset value X to be applied for the search space X and an offset value Y to be applied for the search space Y. Therefore, the UE may determine the start time of the PDCCH monitoring occasion for the POSS for each search space set, based on the offset value configured for each search space set.

In some embodiments of the disclosure, the UE may be configured with one or more search spaces for the POSS from the base station through higher layer signaling, and may be configured with the ps-offset value 702 to be applied to all the configured search spaces. For example, the UE may be configured with the search space X and the search space Y for the POSS, and may be configured with one offset value Z. The UE may determine the start time of the PDCCH monitoring occasion for the POSS by applying the offset value Z for both the search space X and the search space Y. At this time, the start times of the PDCCH monitoring occasions in the search space X and the search space Y may be equal to each other (by applying, for example, [Method 1] or [Method 2] described above) or different from each other (by applying, for example, [Method 3] or [Method 4] described above).

In some embodiments of the disclosure, when the following "Condition B" is satisfied, the UE may consider that the monitoring periodicity 705 of the search space for the POSS is equal to the DRX long cycle (drx-LongCycle) 701 configured in the UE. At this time, when the UE is configured with the periodicity value for the search space through other configuration parameters (e.g., monitoringSlotPeriodicityAndOffset), the UE may ignore all or part of the configuration information indicated by the monitoringSlotPeriodicityAndOffset. For example, the UE may ignore either or both of slot periodicity information and slot offset information among the pieces of configuration information indicated by the monitoringSlotPeriodicityAndOffset. At this time, when the unit of the DRX long cycle configured in the UE does not coincide with the unit of the search space monitoring periodicity, the UE may convert the value into one reference unit. For example, when X ms is configured in the UE as the DRX long cycle, the UE may convert X ms into a Y slot that is the search space monitoring periodicity in slot unit. For example, Y may be determined as $Y = X \cdot 2^\mu$ (slot) (p is a parameter for the subcarrier spacing of the PDCCH and may be defined as $\mu=0, 1, 2, 3$ for 15, 30, 60, and 120 kHz, respectively). The UE may use the value of the DRX long cycle, in which the unit is converted into the slot, as the monitoring periodicity 705 for the POSS. When "Condition B" is not satisfied, the UE may determine the monitoring periodicity 705 of the search space for the POSS by using the original parameter monitoringSlotPeriodicityAndOffset. "Condition B" may be at least one of the following conditions or a combination of one or more of the following conditions.

A case in which ps-offset 702 is configured

A case in which monitoringSlotPeriodicityAndOffset is not configured

A case in which ps-offset 702 is configured and monitoringSlotPeriodicityAndOffset is not configured A case in which information having power saving mode or an effect identical or similar thereto is configured The UE may determine the PDCCH monitoring occasion for the POSS according to the $(1\text{-}1)^{st}$ embodiment of the disclosure and may perform a subsequent operation based on the indication contents of the DCI format detected after the POSS monitoring.

Figure 8:
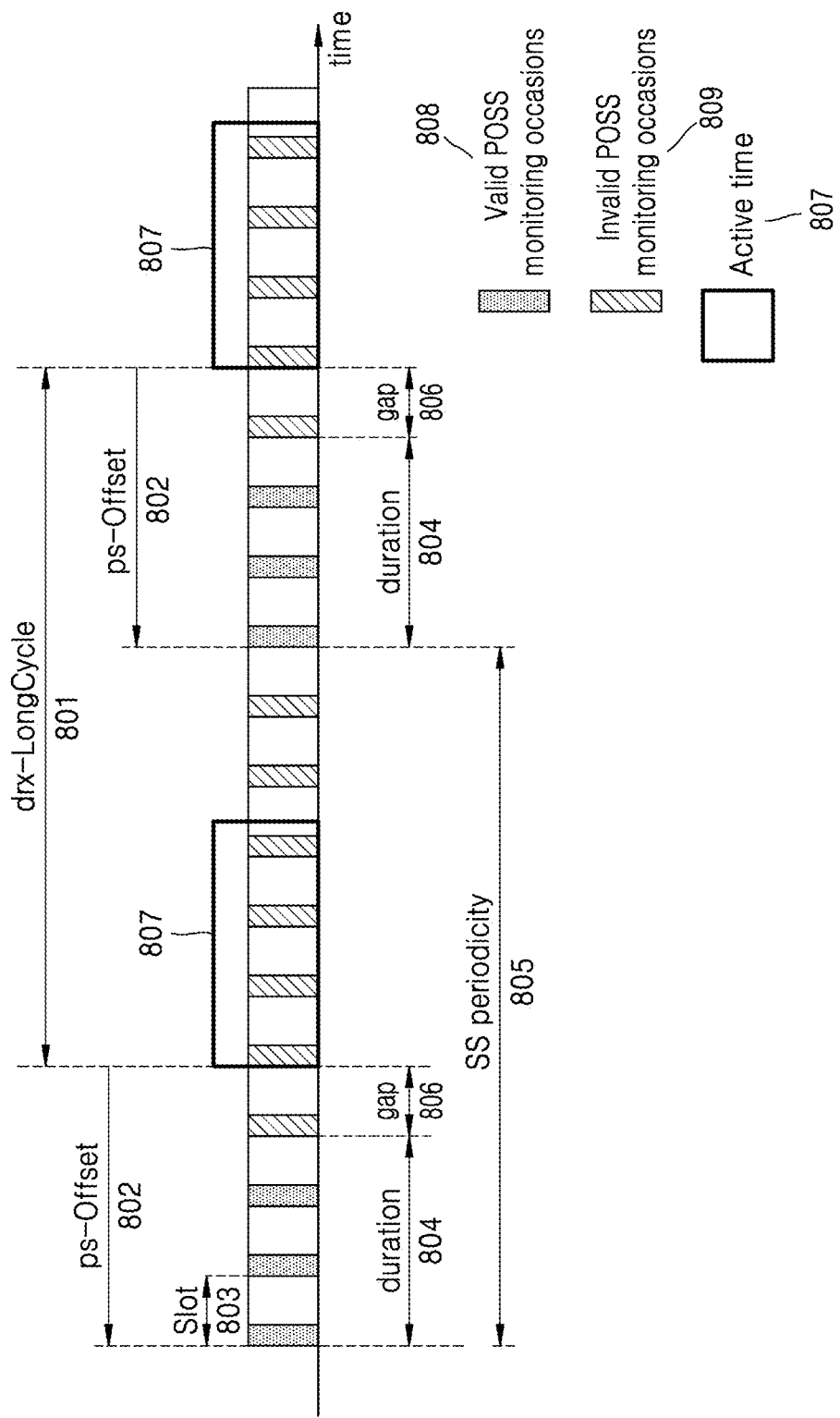
FIG. 8 illustrates a diagram illustrating an example of a POSS configuring method according to an embodiment of the disclosure.

FIG. 8 illustrates a diagram illustrating an example of a method of configuring a PDCCH monitoring occasion for DCI format 3_0 corresponding to a POSS, according to a $(1\text{-}2)^{nd}$ embodiment and a $(1\text{-}3)^{rd}$ embodiment of the disclosure. The $(1\text{-}2)^{nd}$ embodiment will be first described and the $(1\text{-}3)^{rd}$ embodiment will be then described.

$(1\text{-}2)^{nd}$ Embodiment

Referring to FIG. 8, in some embodiments of the disclosure, a UE may be configured with a search space for a POSS (that is, a search space for DCI format 3_0 corresponding to the POSS) from a base station through higher layer signaling. The UE may receive, from the base station, the search space configuration information described in the first embodiment of the disclosure. For example, the UE may receive configuration information such as a monitoring duration 804, a slot level monitoring periodicity 805, and an offset (monitoringSlotPeriodicityAndOffset).

In some embodiments of the disclosure, the UE may be configured with a ps-offset value 802 corresponding to an offset from the start time of a DRX active time 807 (or the DRX on start time) to a start time of a PDCCH monitoring occasion for a POSS, from the base station through higher layer signaling. That is, the UE may determine that the PDCCH monitoring occasion for the POSS starts from a time earlier than the start time of the DRX active time 807 by the ps-offset value 802.

In some embodiments of the disclosure, the UE may differently interpret the monitoring duration 804 according to a specific condition (referred to as "Condition C"). "Condition C" may be at least one of the following conditions or a combination of one or more of the following conditions.

A case in which ps-offset 802 is configured

A case in which information having power saving mode or an effect identical or similar thereto is configured When Condition C is not satisfied, the UE may interpret and apply the monitoring duration 804 in the existing use, that is, as described in the duration of the search space configuration information described above. For example, when X slots, Y slots, and Z slots are respectively configured as the periodicity, the offset, and the duration by the monitoringSlotPeriodicityAndOffset value, the UE may determine that the PDCCH monitoring occasion is present for a total of Z slots (that is, $\{Y, Y+1, Y+2, \ldots, Y+Z-1\}^{th}$ slots) starting from the Y-th slot of the time interval that exists for every X slot periodicity. At this time, the value Z that is configurable as the duration may not be configured to be equal to or greater than the slot periodicity X configured by monitoringSlotPeriodicityAndOffset.

When Condition C is satisfied, the UE may interpret and apply the monitoring duration 804 as a time interval during which the UE monitors the PDCCH. For example, the UE may determine the start time of the PDCCH monitoring occasion for the POSS from the ps-offset value 802 configured by the base station, may determine that PDCCH monitoring occasions existing in the time interval corresponding to duration 804 from the start time are valid, and may determine that PDCCH monitoring occasions existing in the remaining time intervals are invalid. FIG. 8 illustrates valid POSS monitoring occasions 808 and invalid POSS monitoring occasions 809. The UE may perform PDCCH monitoring only for PDCCH monitoring occasions for valid POSS. At this time, the value Z that is configurable as the duration may be configured to be equal to or greater than the slot periodicity X configured by monitoringSlotPeriodicityAndOffset.

The UE may determine the PDCCH monitoring occasion for the POSS according to the $(1-2)^{nd}$ embodiment of the disclosure and may perform a subsequent operation based on the indication contents of the DCI format detected after the POSS monitoring.

$(1-3)^{rd}$ Embodiment

In some embodiments of the disclosure, a UE may be configured with a search space for a POSS (that is, a search space for DCI format 3_0 corresponding to the POSS) from a base station through higher layer signaling. The UE may receive, from the base station, the search space configuration information described in the first embodiment of the disclosure. For example, the UE may receive configuration information such as a monitoring duration 804, a slot level monitoring periodicity 805, and an offset (monitoringSlotPeriodicityAndOffset).

In some embodiments of the disclosure, the UE may be configured with a ps-offset value 802 corresponding to an offset from a start time of a DRX active time 807 (or a DRX on start time) to a start time of a PDCCH monitoring occasion for a POSS, from the base station through higher layer signaling. The UE may determine that PDCCH monitoring occasions existing in a time interval between a time earlier than the start time of the DRX active time 807 by the ps-offset value 802 and a time earlier than the start time of the DRX active time 807 by a gap 806 is valid, and may determine that PDCCH monitoring occasions existing in the remaining time intervals are invalid. FIG. 8 illustrates valid POSS monitoring occasions 808 and invalid POSS monitoring occasions 809. That is, in FIG. 8, the UE may determine that only PDCCH monitoring occasions existing within the time interval corresponding to the monitoring duration 804 are valid. At this time, the gap 806 may be determined based on the capability that is reported to the base station by the UE.

Also, the disclosure may be implemented by a combination of the first embodiment, the $(1-1)^{st}$ embodiment, the $(1-2)^{nd}$ embodiment, and the $(1-3)^{rd}$ embodiment described above.

Second Embodiment

According to an embodiment of the disclosure, the UE may receive an indicator indicating a dormancy state or an active state for a secondary cell from a base station through L1 signaling. When the secondary cell is in the dormancy state, the UE may not perform PDCCH monitoring for the secondary cell (or may intermittently perform PDCCH monitoring), and may continuously perform CSI measurement), adaptive gain control (AGC), beam management, or the like.

According to an embodiment of the disclosure, the UE may receive the indicator indicating the dormancy state or the active state for the secondary cell from the base station through a POSS. More specifically, the following control information may be included in a DCI format corresponding to a POSS (e.g., DCI format 3_0).

First control information: an indicator that controls PDCCH monitoring operation in DRX occasion that is present after POSS monitoring occasion (or it may be expressed by an indicator indicating whether to wake up, ps-Index, etc.).

As an example, when the value of this field indicates "0", the UE may not perform PDCCH monitoring in DRX active time that is subsequently present. (Alternatively, the UE may not start drx-onDurationTimer in DRX occasion that is subsequently present. The above-described operation corresponding to the field value "0" may correspond to an operation that the UE does not wake up.)

As an example, when the value of this field indicates "1", the UE may perform PDCCH monitoring in DRX active time that is subsequently present. (Alternatively, the UE may start drx-onDurationTimer in DRX occasion that is subsequently present. The above-described operation corresponding to the field value "1" may correspond to an operation that the UE wakes up.)

Second control information: an indicator that indicates dormancy state or active state for secondary cell (SCell)

The second control information may include an N-bit bitmap, and each bit of the bitmap may correspond to one secondary cell or one secondary cell group including a plurality of secondary cells.

As an example, when "0" is indicated as one bit value of the bitmap, the UE may configure the cell state to a dormancy state for the secondary cell indicated by the corresponding bit or for all the secondary cells of the secondary cell group indicated by the corresponding bit.

As an example, when "1" is indicated as one bit value of the bitmap, the UE may configure the cell state to the active state for the secondary cell indicated by the corresponding bit or for all the secondary cells of the secondary cell group indicated by the corresponding bit.

Third control information: an indicator that triggers aperiodic CSI reporting

According to an embodiment of the disclosure, the UE may be configured to monitor the POSS in a primary cell (PCell) or a primary secondary cell (PSCell) and may monitor the POSS based on the configuration information. All or part of the contents indicated by the POSS may be equally applied to all the secondary cells of the cell group to which the PCell (or PSCell) belongs (that is, a master cell group (MCG) in the case of the PCell and a secondary cell group (SCG) in the case of the PSCell). For example, when the UE monitors the POSS in the PCell and receives an indicator indicating wake-up through the received POSS, the UE may perform a wake-up operation on all primary cells and secondary cells existing in the MCG, and when the UE receives an indicator indicating not to wake up, the UE may not perform a wake-up operation on all primary cells and secondary cells existing in the MCG. Also, when the UE monitors the POSS in the PSCell and receives an indicator indicating wake-up through the received POSS, the UE may perform a wake-up operation on all primary secondary cells and secondary cells existing in the SCG, and when the UE receives an indicator indicating not to wake up, the UE may not perform a wake-up operation on all primary secondary cells and secondary cells existing in the SCG.

As described above, the UE may receive both the indicator ("first control information") indicating whether to wake up and the indicator ("second control information") indicating the dormancy state for the secondary cell through the DCI format corresponding to the POSS. At this time, both the indicator indicating whether to wake up and the indicator indicating the dormancy state for the secondary cell correspond to an indicator that controls the PDCCH monitoring operation of the UE. Therefore, the operation of the UE may be controlled according to a specific combination of pieces of information indicated by the first control information and the second control information. In the following, the operation of the UE according to a combination of contents of each field in the POSS DCI format is specifically proposed.

1) First Control Information: Wake-Up Indication, Second Control Information: Cell or Cell Group Indicated as Active State The UE may perform a state change to an active state for secondary cells indicated as an active state.

The UE may perform a wake-up operation (that is, an operation of performing PDCCH monitoring in a DRX active time that is subsequently present or an operation of starting drx-onDurationTimer) with respect to cells indicated as an active state among cells of a cell group to which a primary cell where a POSS is received belongs.

2) First Control Information: Wake-Up Indication, Second Control Information: Cell or Cell Group Indicated as Dormancy State The UE may perform a state change to a dormancy state for secondary cells indicated as a dormancy state.

The UE may perform an operation corresponding to at least one of the following operations with respect to cells indicated as a dormancy state among cells of a cell group to which a primary cell where a POSS is received belongs.

Operation 1) The UE may consider, with respect to the cell indicated as the dormancy state, that drx-onDurationTimer has started and a MAC entity still corresponds to a DRX active time. At this time, the UE may not perform PDCCH monitoring in the corresponding DRX active time, and may perform all other operations that the UE has to perform in the DRX active time in the same manner as before (e.g., periodic/semi-permanent CSI reporting operation, periodic/semi-permanent SRS transmission operation, etc.) except for the PDCCH monitoring.

Operation 2) The UE may consider, with respect to the cell indicated as the dormancy state, that a MAC entity does not correspond to a DRX active time. Therefore, the UE may not perform PDCCH monitoring and may not perform all other operations that the UE has to perform in the DRX active time (e.g., periodic/semi-permanent CSI reporting operation, periodic/semi-permanent SRS transmission operation, etc.).

3) First Control Information: Indication not to Wake Up, Second Control Information: Cell or Cell Group Indicated as Active State The UE may perform a state change to an active state for secondary cells indicated as an active state.

The UE may perform an operation corresponding to at least one of the following operations with respect to cells indicated as an active state among cells of a cell group to which a primary cell wherein a POSS is received belongs.

Operation 1) The UE may not expect that the first control information indicates not to wake up and the second control information indicates an active state. Therefore, when the control information of the unexpected combination is received, the UE may regard contents of the DCI format as an error and operate according to a predefined basic operation. The basic operation may correspond to, for example, an operation that is applicable when the UE fails to decode the DCI format corresponding to the POSS (see the operation when the UE does not detect DCI format 3_0 in the first embodiment of the disclosure). That is, when the first control information indicates not to wake up, the second control information may always indicate a dormancy state to all cells. That is, when the first control information indicates not to wake up, the UE may expect that the second control information will always indicate a dormancy state to all cells.

Operation 2) The UE may consider, with respect to a cell indicated as an active state, that a MAC entity does not correspond to a DRX active time. Therefore, the UE may not perform PDCCH monitoring in the corresponding cell.

Operation 3) When there is at least one cell indicated as an active state by the second control information, the UE may start drx-onDurationTimer. However, the UE may not perform PDCCH monitoring for the primary cell (or primary secondary cell) where the POSS is received and the cells indicated as the dormancy state, and may perform PDCCH monitoring only for cells indicated as the active state. The UE may transmit and receive information to and from the cells indicated as the active state by using a control channel and a data channel. The UE may transmit information through a PUCCH to the corresponding activated cell or the primary cell (primary secondary cell or secondary cell configured to transmit a PUCCH to).

Operation 4) When there is at least one cell indicated as an active state by the second control information, the UE may start drx-onDurationTimer. The UE may perform PDCCH monitoring in the DRX active time for the primary cell (or primary secondary cell) where the POSS is received and the cells indicated as the active state, and may not perform PDCCH monitoring for the cells indicated as the dormancy state.

Operation 5) When the first control information indicates not to wake up, the second control information may be reinterpreted as other control information. For example, the second control information may be reinterpreted as an indicator that triggers channel state reporting or SRS transmission. More specifically, the second control information may be reinterpreted as the following contents.

The second control information is reinterpreted as $(2\text{-}1)^{st}$ control information indicating the following contents.

The $(2\text{-}1)^{st}$ control information may include an N-bit bitmap, and each bit of the bitmap may correspond to one secondary cell or one secondary cell group including a plurality of secondary cells.

As an example, when "0" is indicated as one bit value of the bitmap, the UE may not perform channel state reporting or SRS transmission with respect to the secondary cell indicated by the corresponding bit or all the secondary cells of the secondary cell group indicated by the corresponding bit.

As an example, when "1" is indicated as one bit value of the bitmap, the UE may perform channel state reporting or SRS transmission with respect to the secondary cell indicated by the corresponding bit or all the secondary cells of the secondary cell group indicated by the corresponding bit.

The parameter for the channel state reporting or SRS transmission may be configured in advance through higher layer signaling, and the channel state reporting may be performed through a preset PUCCH or PUSCH.

Also, when the first control information indicates not to wake up, the UE may perform a state change to a dormancy state for all the secondary cells of the cell group.

4) First Control Information: Indication not to Wake Up, Second Control Information: Cell or Cell Group Indicated as Dormancy State The UE may perform a state change to a dormancy state for secondary cells indicated as a dormancy state.

The UE may not perform a wake-up operation (that is, an operation of performing PDCCH monitoring in a DRX active time that is subsequently present or an operation of starting drx-onDurationTimer) with respect to cells indicated as a dormancy state among cells of a cell group to which a primary cell where a POSS is received belongs.

According to an embodiment of the disclosure, which operation to follow among the above-described operations of the UE may be preset. That is, the base station may configure in advance which of the above-described operations is performed to the UE through higher layer signaling, and the UE may control subsequent operations based on the configuration information of the base station.

According to an embodiment of the disclosure, the above-described operations of the UE may be different according to UE capability. That is, the UE may perform capability reporting to the base station with respect to an operation that may be performed by the UE, and the base station may appropriately control the operation of the UE based on contents of the capability reporting received from the UE.

$(2\text{-}1)^{st}$ Embodiment

According to an embodiment of the disclosure, a UE may perform the following operations when the UE performs blind decoding on DCI format 3_0 corresponding to a POSS in a PDCCH monitoring occasion for a configured POSS but does not detect DCI format 3_0, or when DCI format 3_0 is not detected because the PDCCH monitoring occasion for the POSS configured in the UE is invalid.

When the UE has been configured with a fallback operation (or ps-fallback) from the base station through higher layer signaling, the UE may perform an operation according to the configuration of the base station. The base station may configure one of the following two operations in the UE as the fallback operation for the case in which DCI format 3_0 is not received.

First operation: monitoring PDCCH in DRX active time that is subsequently present.

Second operation: not monitoring PDCCH in DRX active time that is subsequently present.

When the UE has not been configured with the fallback operation from the base station through higher layer signaling, the UE may not perform PDCCH monitoring in the DRX active time that is subsequently present.

According to an embodiment of the disclosure, the UE may not detect DCI although the UE performs blind decoding on the DCI in PDCCH monitoring occasion in which a DCI format including an indicator indicating a dormancy state or an active state for a secondary cell could be transmitted from the base station, or the UE may not detect DCI format 3_0 because PDCCH monitoring occasion for a POSS configured in the UE is invalid. In this case, it is necessary to define a fallback operation in which the UE determines a dormancy state or an active state for secondary cells. In this regard, specific embodiments of the disclosure are proposed below.

$(2\text{-}1\text{-}1)^{st}$ Embodiment

In the $(2\text{-}1\text{-}1)^{st}$ embodiment of the disclosure, when a UE fails to detect, from a base station, a DCI format indicating whether a secondary cell (or secondary cell group) is in a dormancy state or an active state, the UE may follow at least one of the following fallback operations or an operation corresponding to a combination of one or more of the following fallback operations.

Operation A) The UE may change secondary cell(s) to an active state.

Operation B) The UE may change secondary cell(s) to a dormancy state.

Operation C) The UE may be configured with a fallback mode operation from the base station through higher layer signaling. For example, the base station may configure in advance whether to operate in Operation A or Operation B to the UE through higher layer signaling, and the UE may operate in a configured fallback mode. In the case in which the UE is configured with Operation A, the UE may change the secondary cell(s) to an active state when the UE does not detect the DCI format indicating whether the secondary cell (or secondary cell group) is in a dormancy state or an active state. In the case in which the UE is configured with Operation B, the UE may change the secondary cell(s) to a dormancy state when the UE does not detect the DCI format indicating whether the secondary cell (or secondary cell group) is in a dormancy state or an active state. When the UE fails to receive the configuration for the fallback mode, the fallback mode operation of the UE may be fixed to Operation A or Operation B.

Operation D) The UE may maintain the state of the secondary cell(s) as the same state as the most recent state of the secondary cell(s).

$(2\text{-}1\text{-}2)^{nd}$ Embodiment

In the $(2\text{-}1\text{-}2)^{nd}$ embodiment of the disclosure, a fallback operation of a UE may be differently controlled according to a case in which a DCI format indicating whether a secondary cell (or secondary cell group) is in a dormancy or an active state is monitored in a DRX active time, a case in which the DCI format is monitored in a DRX inactive time, or according to which DCI format is indicated. For the convenience of description, the following conditions are described in advance.

[Condition D]

A case in which a DCI format indicating whether a cell (or secondary cell group) is in a dormancy state or an active state
- corresponds to a DCI format monitored in an area other than a DRX active time
- corresponds to a DCI format indicating whether to monitor a PDCCH (DCI format corresponding to the above-described POSS)
- corresponds to a DCI format not for scheduling purposes

[Condition E]

A case in which a DCI format indicating whether a cell (or secondary cell group) is in a dormancy state or an active state
- corresponds to a DCI format monitored in a DRX active time
- corresponds to a DCI format other than a DCI format indicating whether to monitor a PDCCH (DCI format corresponding to the above-described POSS)
- corresponds to a DCI format for scheduling purposes (e.g., DCI format 0_1/1_1)

The UE may perform the "first fallback" operation for the case in which the UE fails to detect the DCI format including the indicator indicating the dormancy state or the active state for the secondary cell that satisfies all or part of [Condition D]. The "first fallback" operation may follow at least one of the following operations or an operation corresponding to a combination of one or more of the following operations.

Operation 1) The UE may determine the "first fallback" operation based on the configuration information about the fallback operation of the UE for the case in which the UE fails to detect DCI format 3_0 corresponding to the POSS. As an example, the following operation may be followed.

When the UE is configured with "First operation: monitor PDCCH in DRX active time that is subsequently present" as the fallback operation for the case in which the UE fails to receive DCI format 3_0, the UE may perform an operation of changing the secondary cell(s) to the active state as the "first fallback" operation. When the UE is configured with "Second operation: do not monitor PDCCH in DRX active time that is subsequently present" as the fallback operation for the case in which the UE fails to receive DCI format 3_0, the UE may perform an operation of changing the secondary cell(s) to the inactive state as the "first fallback" operation.

When the UE has not been configured with the fallback operation for the case in which the UE fails to receive DCI format 3_0, the UE may perform an operation of changing the corresponding secondary cell(s) to an active state.

Operation 2) The UE may follow at least one of Operation A, Operation B, Operation C, or Operation D of <(2-1-1)$^{st}$ Embodiment> as the "first fallback" operation.

The UE may perform the "second fallback" operation when the UE fails to detect the DCI format including the indicator indicating the dormancy state or the active state for the secondary cell that satisfies all or part of [Condition E]. The "second fallback" operation may follow at least one of the following operations or an operation corresponding to a combination of one or more of the following operations.

Operation 1) The UE may maintain the state of the secondary cell(s) as the same state as the most recent state of the secondary cell(s).

Operation 2) The UE may follow at least one of Operation A, Operation B, or Operation C of <(2-1-1)$^{st}$ Embodiment> as the "first fallback" operation.

Also, the disclosure may be implemented by a combination of the second embodiment, the (2-1)$^{st}$ embodiment, the (2-1-1)$^{st}$ embodiment, and the (2-1-2)$^{nd}$ embodiment described above. Also, the disclosure may be implemented by a combination of the first embodiment, the (1-1)$^{st}$ embodiment, the (1-2)$^{nd}$ embodiment, the (1-3)$^{rd}$ embodiment, the second embodiment, the (2-1)$^{st}$ embodiment, the (2-1-1)$^{st}$ embodiment, and the (2-1-2)$^{nd}$ embodiment described above.

Figure 9:
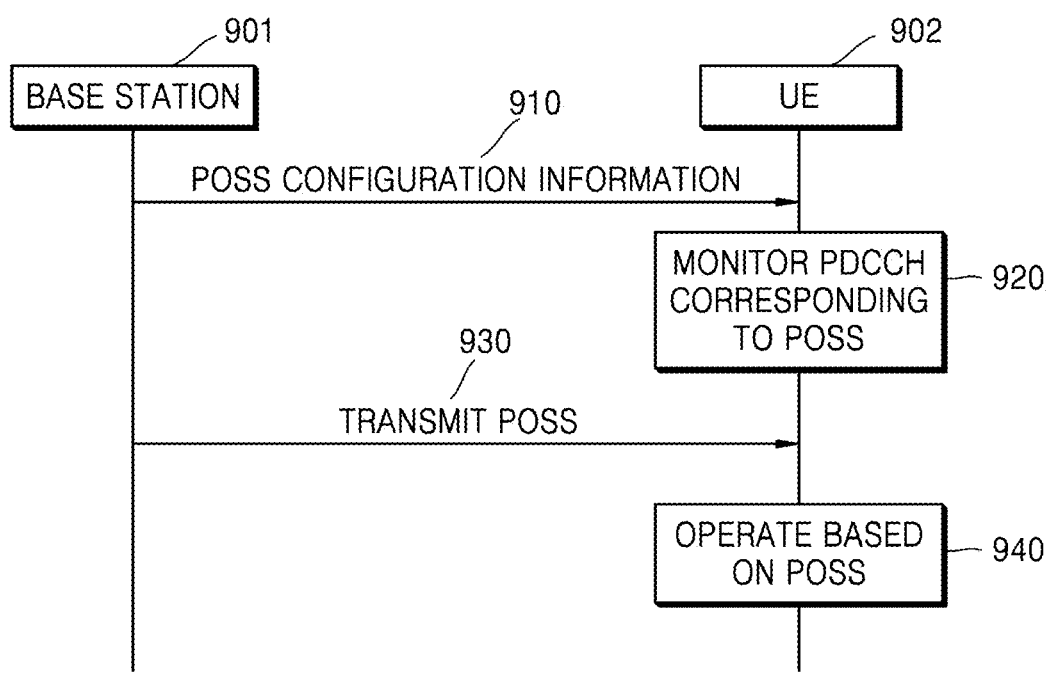
FIG. 9 illustrates a flowchart of a method of saving power of a user equipment (UE) in a wireless communication system, according to an embodiment of the disclosure.

FIG. 9 illustrates a flowchart of a method of saving power of a UE in a wireless communication system, according to an embodiment of the disclosure.

Referring to FIG. 9, in operation 910, a base station 901 may transmit POSS configuration information to a UE 902. The base station 901 may configure a WUS monitoring operation by transmitting the POSS configuration information to the UE 902. In an embodiment of the disclosure, the base station 901 may provide WUS configuration information to the UE 902 through higher layer signaling. In an embodiment of the disclosure, the POSS configuration information may include a search space for a POSS, a POSS start offset, and the like.

In operation 920, the UE 902 may monitor a PDCCH for the POSS based on the POSS configuration information. More specifically, the UE 902 may monitor the PDCCH in a PDCCH monitoring occasion for the POSS, which is a specific time interval where the POSS is receivable, based on the POSS configuration information.

In operation 930, the UE 902 may receive the POSS (or DCI format corresponding to the POSS) from the base station 901 through a PDCCH. That is, while monitoring the PDCCH based on the POSS configuration information in operation 920, the UE 902 may detect the DCI format corresponding to the POSS.

In operation 940, the UE 902 may perform a subsequent operation based on contents indicated in the DCI format corresponding to the received POSS. For example, the UE may perform a PDCCH monitoring operation in a DRX active time and a state change operation for the secondary cell.

Figure 10:
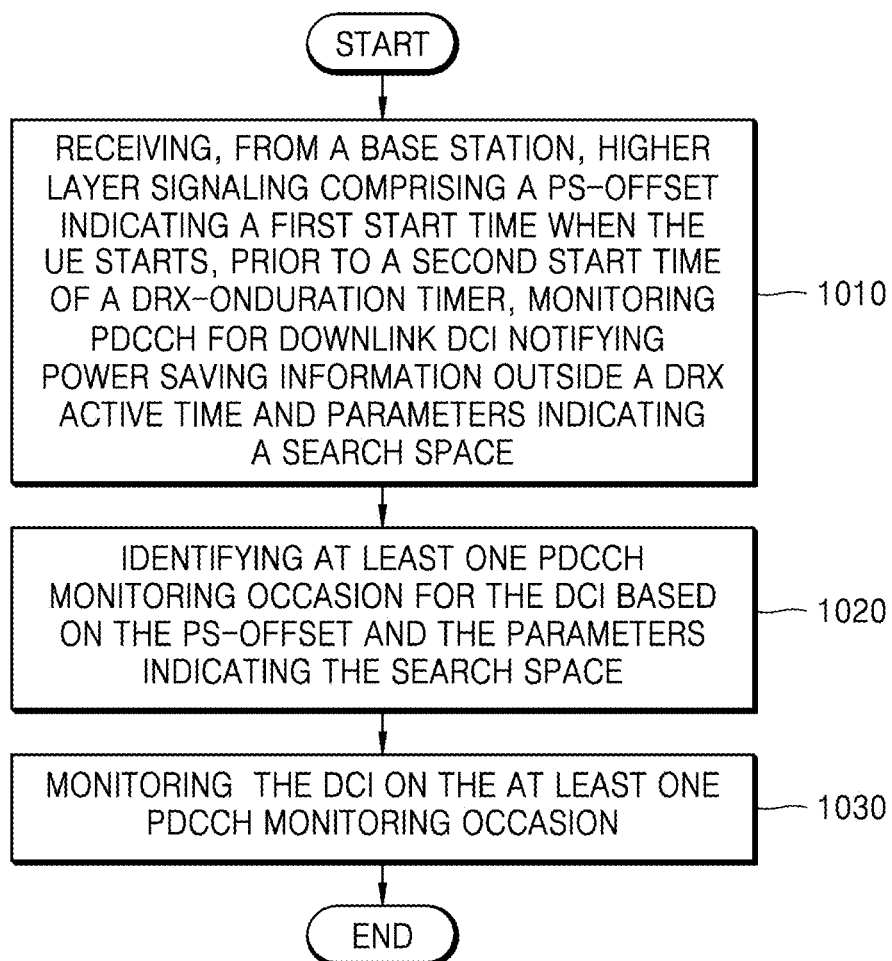
FIG. 10 illustrates a flowchart of a method of saving power of a user equipment (UE) in a wireless communication system, according to an embodiment of the disclosure.

FIG. 10 illustrates a flowchart of a method of saving power of a user equipment (UE) in a wireless communication system, according to an embodiment of the disclosure;

Referring to FIG. 10, in operation 1010, the UE may receive, from a base station, higher layer signaling comprising a power saving offset (PS-offset) indicating a first start time when the UE starts, prior to a second start time of a drx-onDuration timer, monitoring physical downlink channel (PDCCH) for downlink control information (DCI) notifying power saving information outside a discontinuous reception (DRX) active time and parameters indicating a search space. In an embodiment, the parameters indicating the search space may include a monitoring period and a monitoring offset in slot unit, a monitoring duration in slot unit, and at least one symbol in a slot configured for PDCCH monitoring.

In operation 1020, the UE may identify at least one PDCCH monitoring occasion for the DCI based on the PS-offset and the parameters indicating the search space. In an embodiment, the UE may identify the at least one monitoring occasion which is located before the second start time and located in a monitoring time interval after the first start time among at least one monitoring time interval indicated by the parameters indicating the search space.

In an embodiment, the at least one monitoring time interval indicated by the parameters indicating the search space may include each time interval during the monitoring duration from each slot determined by the monitoring offset from each first slot of each time period that exists for periodicity of the monitoring period.

In an embodiment, the UE may identify the at least one monitoring occasion which is located before a predetermined time gap from the second start time.

In operation 1030, the UE may monitor the DCI on the at least one PDCCH monitoring occasion.

Figure 11:
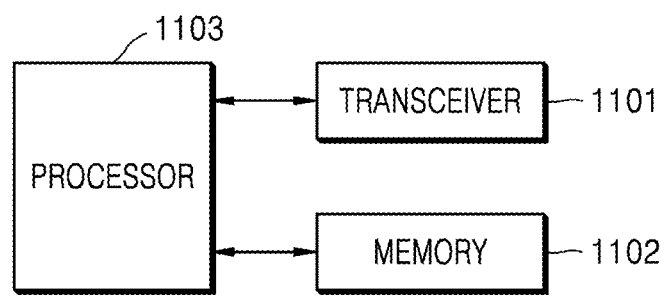
FIG. 11 illustrates a block diagram illustrating an internal structure of a UE, according to an embodiment of the disclosure.
Figure 12:
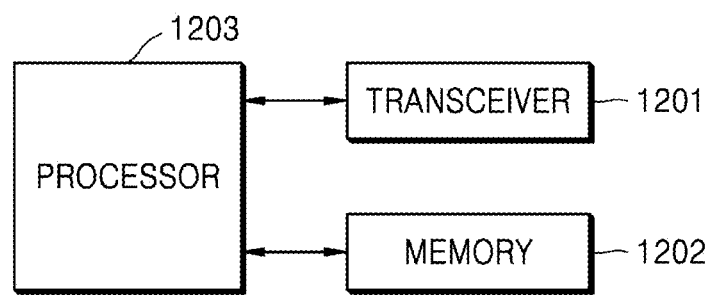
FIG. 12 illustrates a block diagram illustrating an internal structure of a base station, according to an embodiment of the disclosure.

FIG. 11 illustrates a transceiver, a memory, and a processor of the UE for performing the above-described embodiments of the disclosure, and FIG. 12 illustrates a transceiver, a memory, and a processor of the base station for performing the above-described embodiments of the disclosure. In order to perform the POSS transmission and reception method, the PDCCH monitoring control method, and the data transmission and reception operation, the transceivers, the memories, and the processors of the base station and the UE may operate according to the above-described embodiments.

FIG. 11 illustrates a block diagram illustrating an internal structure of a UE, according to an embodiment of the disclosure.

Referring to FIG. 11, the UE may include a transceiver 1101, a memory 1102, and a processor 1103. However, the elements of the UE are not limited to the above-described example. For example, the UE may include more elements or fewer elements than the above-described elements. Also, the transceiver 1101, the memory 1102, and the processor 1103 may be implemented in the form of a single chip.

In an embodiment of the disclosure, the transceiver 1101 may transmit and receive signals with the base station. The signal may include control information and data. To this end, the transceiver 1101 may include an RF transmitter that performs up-conversion and amplification on a frequency of a signal to be transmitted, and an RF receiver that performs low-noise amplification on a received signal and performs down-conversion on a frequency of the received signal. Also, the transceiver 1101 may receive a signal through a radio channel, output the signal to the processor 1103, and transmit an output signal of the processor 1103 through the radio channel.

In an embodiment of the disclosure, the memory 1102 may store programs and data necessary for the operation of the UE. Also, the memory 1102 may store control information or data included in the signal transmitted and received by the UE. The memory 1102 may be configured as a storage medium, such as read-only memory (ROM), random access memory (RAM), hard disk, compact disc read-only memory (CD-ROM), and digital versatile disc (DVD), or a combination of these storage media. Also, the memory 1102 may include a plurality of memories. According to an embodiment of the disclosure, the memory 1102 may store a program for performing an operation for power saving of the UE.

In an embodiment of the disclosure, the processor 1103 may control a series of processes that enable the UE to operate according to the above-described embodiments of the disclosure. In an embodiment of the disclosure, the processor 1103 may execute a program stored in the memory 1102 to receive WU configuration information from the base station, monitor a PDCCH based on POSS configuration information, receive a POSS from the base station through the PDCCH, and wake up based on the POSS.

FIG. 12 illustrates a block diagram illustrating an internal structure of a base station, according to an embodiment of the disclosure.

Referring to FIG. 12, the UE may include a transceiver 1201, a memory 1202, and a processor 1203. However, the elements of the base station are not limited to the above-described example. For example, the base station may include more elements or fewer elements than the above-described elements. Also, the transceiver 1201, the memory 1202, and the processor 1203 may be implemented in the form of a single chip.

In an embodiment of the disclosure, the transceiver 1201 may transmit and receive signals with the UE. The signal may include control information and data. To this end, the transceiver 1201 may include an RF transmitter that performs up-conversion and amplification on a frequency of a signal to be transmitted, and an RF receiver that performs low-noise amplification on a received signal and performs down-conversion on a frequency of the received signal. Also, the transceiver 1201 may receive a signal through a radio channel, output the signal to the processor 1203, and transmit an output signal of the processor 1203 through the radio channel.

In an embodiment of the disclosure, the memory 1202 may store programs and data necessary for the operation of the base station. Also, the memory 1202 may store control information or data included in the signal transmitted and received by the base station. The memory 1202 may be configured as a storage medium, such as ROM, RAM, hard disk, CD-ROM, and DVD, or a combination of these storage media. Also, the memory 1202 may include a plurality of memories. According to an embodiment of the disclosure, the memory 1202 may store a program for performing an operation for power saving of the UE.

In an embodiment of the disclosure, the processor 1203 may control a series of processes that enable the base station to operate according to the above-described embodiments of the disclosure. In an embodiment of the disclosure, the processor 1203 may execute a program stored in the memory 1202 to transmit POSS configuration information to the UE, transmit a POSS to the UE through a PDCCH based on the POSS configuration information, and transmit control information to the UE through the PDCCH based on the POSS.

The methods according to the embodiments of the disclosure, which are described in the claims or the specification of the disclosure, may be implemented as hardware, software, or a combination of hardware and software.

When implemented by software, a computer-readable storage medium for storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

The one or more programs (software modules, software, etc.) may be stored in RAM, non-volatile memory including flash memory, ROM, electrically erasable programmable read only memory (EEPROM), magnetic disc storage device, CD-ROM, DVDs, other types of optical storage devices, or magnetic cassette. Alternatively, the one or more programs may be stored in a memory provided by a combination of all or part of these devices. Also, each memory may include a plurality of configured memories.

Also, the one or more programs may be stored in an attachable storage device that is accessible through a communication network such as Internet, intranet, local area network (LAN), wide LAN (WLAN), or storage area network (SAN), or a communication network provided by a combination thereof. These storage devices may be connected through an external port to a device that performs the embodiments of the disclosure. Also, a separate storage device on the communication network may access the device that performs the embodiment of the disclosure.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
    receiving, from a base station, a radio resource control (RRC) message including power saving offset information indicating a time where the UE starts monitoring, prior to a start of a drx-onDurationTimer, a physical downlink control channel (PDCCH) for detection of downlink control information (DCI) related to power saving;
    monitoring the PDCCH for the detection of the DCI related to the power saving, based on the RRC message; and
    detecting the DCI related to the power saving, the DCI including wake-up indication information and dormancy indication information for a secondary cell (Scell), wherein the wake-up indication information indicates whether to start the drx-onDurationTimer for next discontinuous reception (DRX) cycle, and
    wherein a PDCCH monitoring operation for the Scell is not performed during a DRX active time in case that the wake-up indication information indicates to start the drx-onDurationTimer for the next DRX cycle and that the dormancy indication information indicates a cell state of the Scell as a dormancy state.

2. The method of claim 1, wherein the RRC message further includes search space information for monitoring the PDCCH for the detection of the DCI related to the power saving.

3. The method of claim 2, wherein the search space information includes a parameter indicating a periodicity and an offset for monitoring the PDCCH for the detection of the DCI related to the power saving.

4. The method claim 2, wherein the search space information includes a parameter indicating a number of consecutive slots in which a search space exists.

5. The method of claim 2, further comprising:
    identifying at least one PDCCH monitoring occasion for the DCI, based on the power saving offset information and the search space.

6. The method of claim 5, wherein the at least one PDCCH monitoring occasion is located before a predetermined time gap from the start of the drx-onDurationTimer.

7. A user equipment (UE) in a wireless communication system, the UE comprising:
    at least one transceiver;
    at least one processor communicatively coupled to the at least one transceiver; and
    at least one memory, communicatively coupled to the at least one processor, storing instructions executable by the at least one processor to cause the UE to:
        receive, from a base station, a radio resource control (RRC) message including power saving offset information indicating a time where the UE starts monitoring, prior to a start of a drx-onDurationTimer, a physical downlink control channel (PDCCH) for detection of downlink control information (DCI) related to power saving;
        monitor the PDCCH for the detection of the DCI related to the power saving, based on the RRC message; and
        detect the DCI related to the power saving, the DCI including wake-up indication information and dormancy indication information for a secondary cell (Scell), wherein the wake-up indication information indicates whether to start the drx-onDurationTimer for next discontinuous reception (DRX) cycle, and
    wherein a PDCCH monitoring operation for the Scell is not performed during a DRX active time in case that the wake-up indication information indicates to start the drx-onDurationTimer for the next DRX cycle and that the dormancy indication information indicates a cell state of the Scell as a dormancy state.

8. The UE of claim 7, wherein the RRC message further includes search space information for monitoring the PDCCH for the detection of the DCI related to the power saving.

9. The UE of claim 8, wherein the search space information includes a parameter indicating a periodicity and an offset for monitoring the PDCCH for the detection of the DCI related to the power saving.

10. The UE claim 8, wherein the search space information includes a parameter indicating a number of consecutive slots in which a search space exists.

11. The UE of claim 8, wherein the UE is further caused to:
    identify at least one PDCCH monitoring occasion for the DCI, based on the power saving offset information and the search space information.

12. The UE of claim 11, wherein the at least one PDCCH monitoring occasion is located before a predetermined time gap from the start of the drx-onDurationTimer.

13. One or more non-transitory computer-readable storage media storing computer-executable instructions that, when executed by at least one processor of a user equipment (UE), cause the UE to perform operations, the operations comprising:
    receiving, from a base station, a radio resource control (RRC) message including power saving offset information indicating a time where the UE starts monitoring, prior to a start of a drx-onDurationTimer, a physical downlink control channel (PDCCH) for detection of downlink control information (DCI) related to power saving;

monitoring the PDCCH for the detection of the DCI related to the power saving, based on the RRC message; and
detecting the DCI related to the power saving, the DCI including wake-up indication information and dormancy indication information for a secondary cell (Scell), wherein the wake-up indication information indicates whether to start the drx-onDurationTimer for next discontinuous reception (DRX) cycle, and
wherein a PDCCH monitoring operation for the Scell is not performed during a DRX active time in case that the wake-up indication information indicates to start the drx-onDurationTimer for the next DRX cycle and that the dormancy indication information indicates a cell state of the Scell as a dormancy state.

* * * * *